United States Patent
Kriegel et al.

(10) Patent No.: US 11,117,700 B2
(45) Date of Patent: Sep. 14, 2021

(54) FURANOIC POLYMER PREFORMS, CONTAINERS AND PROCESSING

(71) Applicant: The Coca-Cola Company, Atlanta, GA (US)

(72) Inventors: Robert M. Kriegel, Decatur, GA (US); Ronald D. Moffitt, Spartanburg, SC (US); Mikell W. Schultheis, Acworth, GA (US); Yu Shi, Branchburg, NJ (US); Xiaorong You, Smyrna, GA (US)

(73) Assignee: The Coca-Cola Company, Atlanta, GA (US)

( * ) Notice: Subject to any disclaimer, the term of this patent is extended or adjusted under 35 U.S.C. 154(b) by 517 days.

(21) Appl. No.: 14/475,418

(22) Filed: Sep. 2, 2014

(65) Prior Publication Data

US 2015/0110983 A1    Apr. 23, 2015

Related U.S. Application Data

(60) Provisional application No. 61/872,524, filed on Aug. 30, 2013.

(51) Int. Cl.
*B65D 1/40* (2006.01)
*B65D 1/02* (2006.01)
(Continued)

(52) U.S. Cl.
CPC ............ *B65D 1/0207* (2013.01); *B29B 11/14* (2013.01); *B29C 49/0005* (2013.01); *B29C 49/08* (2013.01); *B29B 11/08* (2013.01); *B29B 2911/1433* (2015.05); *B29B 2911/14331* (2015.05); *B29B 2911/14332* (2015.05); *B29B 2911/14336* (2015.05); *B29B 2911/14486* (2013.01); *B29B 2911/14713* (2013.01); *B29C 49/06* (2013.01); *B29K 2067/003* (2013.01);
(Continued)

(58) Field of Classification Search
CPC .......... B65D 1/40; B65D 41/00; B65D 83/38; B65D 41/02; B65D 1/0207; Y10T 428/1352; B29L 2031/7158
USPC .............................................. 428/35.7, 34.1
See application file for complete search history.

(56) References Cited

U.S. PATENT DOCUMENTS 6,063,465 A    5/2000   Charbonneau et al.
8,083,064 B2   12/2011  Boswell et al.
(Continued)

FOREIGN PATENT DOCUMENTS

JP    2008-142937    6/2008
JP    2008-540186    11/2008
(Continued)

OTHER PUBLICATIONS

Search Report for corresponding international application, PCT/US2014/053749, dated Jan. 22, 2015.
(Continued)

*Primary Examiner* — Ellen S Hock
(74) *Attorney, Agent, or Firm* — King & Spalding

(57) ABSTRACT

Preforms and methods of processing 2,5-furandicarboxylic acid (FDCA) polymers, such as poly(ethylene-2,5-furandicaboxylate (PEF), to produce preforms and articles, such as containers. The present invention also includes preforms with superior processing characteristics and containers, such as PEF beverage bottles, with superior performance properties.

21 Claims, 14 Drawing Sheets

(51) Int. Cl.
    *B29B 11/14* (2006.01)
    *B29C 49/00* (2006.01)
    *B29C 49/08* (2006.01)
    B29B 11/08 (2006.01)
    B29L 31/00 (2006.01)
    B29K 67/00 (2006.01)
    B29C 49/06 (2006.01)

(52) U.S. Cl.
    CPC .... *B29K 2067/043* (2013.01); *B29K 2067/06* (2013.01); *B29L 2031/7158* (2013.01); *Y10T 428/1352* (2015.01); *Y10T 428/1379* (2015.01)

(56) References Cited

U.S. PATENT DOCUMENTS

2005/0260371 A1   11/2005  Shi et al.
2006/0255049 A1*  11/2006  McCarthy .......... A47G 19/2205
                                              220/703
2010/0143525 A1*  6/2010  Kuntz ................... B29C 33/308
                                              425/342.1
2013/0270212 A1*  10/2013  Collias .................... B65D 1/40
                                              215/316

FOREIGN PATENT DOCUMENTS

| | | |
|---|---|---|
| JP | 2010-247497 | 11/2010 |
| RU | 2440894 | 1/2012 |
| WO | WO 2006124200 | 11/2006 |
| WO | WO 2007124428 | 11/2007 |
| WO | WO 2013/062408 | 5/2013 |
| WO | WO 2015015243 | 2/2015 |

OTHER PUBLICATIONS

Supplemental European Search Report for EP 14839781, dated Mar. 14, 2017.

\* cited by examiner

FIG. 2A  FIG. 2B

FIG. 8B  FIG. 8C

FURANOIC POLYMER PREFORMS, CONTAINERS AND PROCESSING

CROSS REFERENCE TO RELATED APPLICATIONS

This non-provisional patent application claims the benefit of U.S. provisional application Ser. No. 61/872,524, filed Aug. 30, 2013, hereby incorporated by reference in its entirety.

FIELD OF THE INVENTION

The present invention is directed to preforms and methods of processing 2,5-furandicarboxylic acid (FDCA)-based polymers, such as poly(ethylene-2,5-furandicaboxylate (PEF), to produce preforms and articles, such as containers (e.g., bottles). The present invention also includes preforms and articles, such as containers.

BACKGROUND OF THE INVENTION

Polyethylene terephthalate (PET) is a polyester made from terephthalic acid (TA) and ethylene glycol (EG). PET resins are commonly used to produce containers for beverages in view of PET's good combination of clarity, mechanical, and gas barrier properties Most commercial methods to produce PET utilize raw materials derived from petrochemicals. As the popularity of PET packaging has grown, concerns regarding the environmental impact of petrochemically-derived PET (petro-PET) have become more significant. Various strategies for limiting the environmental impact of petro-PET have been explored, including (i) source reduction (i.e., reducing the amount of petro-PET in a given container); (ii) replacement of petrochemical raw materials with renewable raw materials (e.g., sugarcane) to provide biologically-derived PET (bio-PET) and (iii) replacement of petro-PET with polylactic acid (PLA), a bio-based polymer.

While these strategies have had some positive impact, they have generally required compromise as to physical performance of the container and/or cost of materials. As such, there remains a need for novel strategies to limit the environmental impact of petro-PET while still satisfying consumer needs for plastic containers with appropriate physical performance characteristics.

While PET is generally considered to offer good gas barrier properties, this property varies considerably with size. A smaller container has a larger surface area to volume ratio resulting in a higher relative loss rate. For this reason, PET containers are currently used only as larger containers for packaging carbonated soft drinks, while metal cans and glass containers are the choice for smaller carbonated soft drink containers. As such, there remains a need for novel strategies to provide small plastic containers offering improved gas barrier properties.

2,5-Furandicarboxylic acid (FDCA) is an oxidized furan derivative derived from renewable resources. Possible applications for FDCA-based polymers include the numerous and varied current uses of polymers containing terephthalic acid (TA), for which FDCA can substitute. Polyethylene furanoate (PEF) is an FDCA-based polymer made from FDCA and ethylene glycol, and is of interest for use in various applications including packaging.

Accordingly, it is a primary object of the present invention to provide preforms and methods for processing FDCA-based polymers, such as PEF, in order to provide preforms and articles, such as containers (e.g., bottles).

It is another object of the present invention to provide FDCA-based polymer preforms that may be processed similarly to PET preforms.

It is a still further object of the present invention to provide FDCA-based polymer containers, such as PEF containers, offering performance characteristics similar or even superior to PET containers.

It is a particular object of the present invention to provide preforms and methods for producing FDCA-based polymer beverage containers (e.g., bottles) with a volume of less than about 500 ml.

SUMMARY OF THE INVENTION

It has been surprisingly discovered that conventional methods for processing PET cannot be successfully applied to polyethylene furanoate (PEF) in the production of containers, such as food and beverage containers. The present invention provides novel preforms and methods for processing polymers comprising FDCA to produce such preforms and containers by stretch blow molding. The present invention also extends to containers formed using the disclosed preforms and methods. Advantageously, the containers of the present invention are bio-based, as opposed to the petroleum-based, while retaining or improving upon their performance characteristics (e.g., barrier properties, shelf life).

In a first aspect, the present invention is a preform comprising a polymer comprising a diol component and an FDCA component, wherein the preform has a hoop stretch ratio and axial stretch ratio that allows for the production of stretch blow molded container with performance properties comparable or superior to stretch blow molded containers made conventional PET resins.

In one embodiment, the present invention is a preform comprising a diol component and an FDCA component, wherein the preform has (i) a hoop stretch ratio between about 2.6 and about 8.2; and (ii) an axial stretch ratio between about 2.0 and about 5.0. In exemplary embodiments, the preform comprises ethylene glycol and FDCA.

In a preferred embodiment, the present invention is a preform comprising a diol component and an FDCA component, wherein the preform has (i) a hoop stretch ratio between about 5.2 and about 7.2 and (ii) an axial stretch ratio between about 2.3 and about 3.3. In certain embodiments, the preform comprises ethylene glycol and FDCA.

In exemplary embodiments, the present invention is a preform comprising a diol component and an FDCA component, wherein the preform has (i) a hoop stretch ratio between about 2.6 and about 8.2, or more particularly, about 5.2 and about 7.2; (ii) an axial stretch ratio between about 2.0 and about 5.0, or more particularly, about 2.3 and about 2.3, and (iii) a length of between about 20 mm and about 400 mm, or more particularly, about 20 mm to about 50 mm, about 50 to about 100 mm, about 100 to about 200 mm, about 200 to about 300 mm or about 300 to about 400 mm. In certain embodiments, the preform comprises ethylene glycol and FDCA.

In one embodiment, the preform has an IV of between about between 0.65 and 1.00 dL/g.

In a particular embodiment, the preform has an IV between about 0.80 and about 0.95 dL/g, more particularly, about 0.83 and about 0.92 dL/g.

In a second aspect, the prevention invention is a container made from a preform comprising a diol component and an FDCA component, wherein the container has properties comparable or superior to stretch blow molded containers made from conventional PET resins.

In one embodiment, the present invention is container made from a preform comprising a diol component and an FDCA component, wherein the preform has (i) a hoop stretch ratio between about 2.6 and about 8.2, and (ii) an axial stretch ratio between about 2.0 and about 5.0. In certain embodiments, the preform comprises ethylene glycol and FDCA.

In a preferred embodiment, the container is made from a preform comprising a diol component and an FDCA component, wherein the preform has (i) a hoop stretch ratio between about 5.2 and about 7.2 and (ii) an axial stretch ratio between about 2.3 and about 3.3. In exemplary embodiments, the preform comprises ethylene glycol and FDCA.

In one embodiment, the preform has an IV of between about between 0.65 and 1.00 dL/g.

In a particular embodiment, the preform has an IV between about 0.80 and about 0.95 dL/g, more particularly, about 0.83 and about 0.92 dL/g.

In exemplary embodiments, the container is a food or beverage container.

In exemplary embodiments, the container is a beverage bottle.

In exemplary embodiments, the container is a hot-fill container.

In exemplary embodiments, the preform has length of between about 20 mm and about 400 mm, or more particularly, about 20 mm to about 50 mm, about 50 to about 100 mm, about 100 to about 200 mm, about 200 to about 300 mm or about 300 to about 400 mm.

In exemplary embodiments, the container is a beverage bottle having a volume of greater than about 500 mL, greater than about 1 L or greater than about 2 L or about 3 L.

In exemplary embodiments, the container is a beverage bottle having a volume of about 500 mL or less, more particularly, about 400 mL, about 300 mL, about 200 mL or about 100 mL.

In one embodiment, the container has a shelf life that is at least equal to a corresponding PET container made from a conventional PET preform.

In another embodiment, the container has a shelf life that is improved relative to a corresponding PET container made from a conventional PET preform.

In another particular embodiment, the container has a shelf life that is at least one, at least two, at least three, at least four, at least five, at least six, at least seven, at least eight, at least nine, or at least ten weeks longer than a corresponding PET container or a PEF container made from a conventional PET preform.

In another particular embodiment, the container has a shelf life of at least eight, at least ten, at least twelve, at least fourteen, at least sixteen, at least eighteen, at least twenty, at least twenty two, at least twenty four, at least twenty six, at least twenty eight, at least thirty weeks, at least forty or at least fifty weeks or longer.

In a third aspect, the present invention is a method of making a preform, comprising (i) providing a polymer melt comprising a diol component and a FDCA component; and (ii) injection molding the polymer melt to produce a preform having (i) a hoop stretch ratio between about 2.6 and about 8.2, or more particularly, about 5.2 and about 7.2, and (ii) an axial stretch ratio between about 2.0 and about 5.0, or more particularly, about 2.3 and about 3.3. In certain embodiments, the preform comprises ethylene glycol and FDCA.

In one embodiment, the preform has an IV of between about 0.65 and about 1.00 dL/g, more particularly, about 0.80 and about 0.95 dL/g, or even more particularly, about 0.83 and about 0.92 dL/g.

In another embodiment, the preform has length of between about 20 mm and about 400 mm, or more particularly, about 20 mm to about 50 mm, about 50 to about 100 mm, about 100 to about 200 mm, about 200 to about 300 mm or about 300 to about 400 mm.

In a fourth aspect, the present invention is method for making a container, comprising (i) providing a preform comprising a diol component and an FDCA component, where the preform preform has (a) a hoop stretch ratio between about 2.6 and about 8.2, or more particularly, about 5.2 and about 7.2, and (b) an axial stretch ratio between about 2.0 and about 5.0, or more particularly, about 2.3 and about 3.3; and (ii) stretch blow molding the preform to provide a container. In certain embodiments, the preform comprises ethylene glycol and FDCA.

In one embodiment, the preform has an IV of between about between 0.65 and 1.00 dL/g.

In a particular embodiment, the preform has an IV between about 0.80 and about 0.95 dL/g, more particularly, about 0.83 and about 0.92 dL/g.

In exemplary embodiments, the container is a food or beverage container.

In exemplary embodiments, the container is a beverage bottle.

In exemplary embodiments, the container is a hot-fill container.

In exemplary embodiments, the preform has length of between about 20 mm and about 400 mm, or more particularly, about 20 mm to about 50 mm, about 50 to about 100 mm, about 100 to about 200 mm, about 200 to about 300 mm or about 300 to about 400 mm.

In exemplary embodiments, the container is a beverage bottle having a volume of greater than about 500 mL, greater than about 1 L or greater than about 2 L or about 3 L.

In exemplary embodiments, the container is a beverage bottle having a volume of about 500 mL or less, more particularly, about 400 mL, about 300 mL, about 200 mL or about 100 mL.

In one embodiment, the container has a shelf life that is at least equal to a corresponding PET container made from a conventional PET preform.

In another embodiment, the container has a shelf life that is improved relative to a corresponding PET container made from a conventional PET preform.

In another particular embodiment, the container has a shelf life that is at least one, at least two, at least three, at least four, at least five, at least six, at least seven, at least eight, at least nine, or at least ten weeks longer than a corresponding PET container or a PEF container made from a conventional PET preform.

In another particular embodiment, the container has a shelf life of at least eight, at least ten, at least twelve, at least fourteen, at least sixteen, at least eighteen, at least twenty, at least twenty two, at least twenty four, at least twenty six, at least twenty eight, at least thirty weeks, at least forty or at least fifty weeks or longer.

DETAILED DESCRIPTION OF THE INVENTION

Figure 1A:
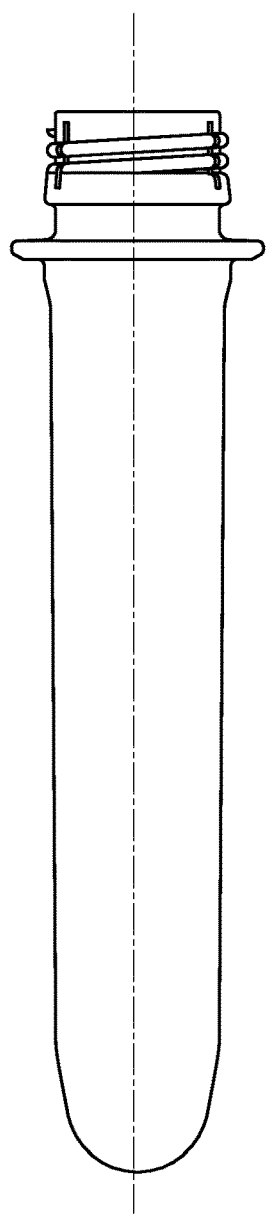
FIG. 1: Is a sectional view of an injection molded preform in accordance with an embodiment of the present invention.

The present invention is directed to methods of processing FDCA-based polymers, such as PEF, to produce containers. The present invention also includes FDCA-based preforms and containers, such as bottles.

Definitions

As used herein, the terms "polymer," "polymers," "polymeric," and similar terms are used in their ordinary sense as understood by one skilled in the art, and thus may be used herein to refer to or describe a large molecule (or group of such molecules) that contains recurring units. Polymers may be formed in various ways, including by polymerizing monomers and/or by chemically modifying one or more recurring units of a precursor polymer. A polymer may be a "homopolymer" comprising substantially identical recurring units formed by, e.g., polymerizing a particular monomer. A polymer may also be a "copolymer" comprising two or more different recurring units formed by, e.g., copolymerizing two or more different monomers, and/or by chemically modifying one or more recurring units of a precursor polymer. The term "terpolymer" may be used herein to refer to polymers containing three or more different recurring units.

Generally, while the polymers, compositions and processes are described in terms of "comprising" various components or steps, the polymers, compositions and processes can also "consist essentially of" or "consist of" the various components and steps.

The term "entanglement density" as used herein refers to the number of chain entanglements in a given volume or amount of polymer and is proportional to the plateau modulus for the polymer at a given temperature. The concept of chain entanglement density may be understood by considering the definitions provided herein for chain entanglement, physical network and entanglement network. These definitions correspond to those provided by the International Union of Pure and Applied Chemistry (IUPAC), as given in the IUPAC reference document PAC, 2007, 79, 1801 (Definitions of terms relating to the structure and processing of sols, gels, networks, and inorganic-organic hybrid materials," (IUPAC Recommendations 2007) doi: 10.1351/pac200779101801.)

The term "entanglement molecular weight (Me) as used herein means as used herein refers to the molecular weight of a chain segment between two nearest junction points in an entanglement network or physical network as described above.

The term "creep" as used herein means the tendency of a solid material to move slowly or deform permanently under the influence of mechanical stresses. It can occur as a result of long-term exposure to high levels of stress that are still below the yield strength of the material. Plastic products are said to show a "creep behavior" where the product is deformed at room temperature as time elapses when an external force is applied continuously. Creep resistance, correspondingly, refers to the a material's ability to resist any kind of distortion when under a load over an extended period of time.

Creep testing entails applying a small constant stress to a sample and monitoring its deformation over time. When a viscoelastic material is subjected to a creep test the initial stage of the test is dominated by elastic, recoverable deformation. As the test progresses the sample reaches an elastic equilibrium and only residual viscous non-recoverable flow persists. From the gradient of the strain/time plot in the later viscous-flow stage of the test zero-shear viscosity can be calculated. By extrapolating the straight-line regression from this part of the curve to an intercept on the strain axis it is possible to obtain the equilibrium elastic strain obtained from the sample—the maximum elastic recoverable strain under the specific imposed stress. Strain values can be divided by the applied stresses to obtain compliance, (symbol: J(t)), useful for where differing stresses are employed and the results are to be overlaid.

The term "preform" refers to an injection molded plastic form used in the production of stretch blow molded articles. Typically, preforms are produced with the necks of the bottles, including threads (the "finish") on one end. Preform dimensions are a function of blown bottle geometry and volume.

The term "viscosity" refers to the resistance to flow of a material. Viscosity is reported in units of Pa·s (Pascal·second).

The term "intrinsic viscosity" refers to the ratio of a solution's specific viscosity to the concentration of the solute, extrapolated to zero concentration. Intrinsic viscosity reflects the capability of a polymer in solution to enhance the viscosity of the solution. The viscosity behavior of macromolecular substances in solution is one of the most frequently used approaches for characterization. The intrinsic viscosity number is defined as the limiting value of the specific viscosity/concentration ratio at zero concentration. Intrinsic viscosity is determined by measuring the relative viscosity at several different concentrations and then extrapolating the specific viscosity to zero concentration.

The variation of the viscosity number with concentration depends on the type of molecule as well as the solvent. In general, the intrinsic viscosity of linear macromolecular substances is related to the molecular weight or degree of polymerization.

Polymer Composition

The preforms and containers of the present invention are made from FDCA-based polymers, i.e., polymers having an FDCA component. FDCA provides a renewable building block formed by an oxidative dehydration of glucose. It can be substituted for TA in the production of polyesters, polyamides and polyurethanes.

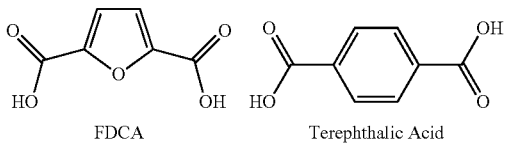

FDCA                Terephthalic Acid

TA is a component of a wide array of polyesters, such as PET and polybutyleneterephthalate (PBT). FDCA has been substituted for TA to prepare various linear polyesters (See A. S. Amarasekara, "5-Hydroxymethylfurfural based polymers," in Renewable Polymers, V. Mittal, Ed., pp. 381-428, Wiley-Scrivener, Salem, Mass., USA, 2011; M. Gomes, A. Gandini, A. J. D. Silvestre, and B. Reis, "Synthesis and characterization of poly(2,5-furandicarboxylate)s based on a variety of diols," Journal of Polymer Science A, vol. 49, no. 17, pp. 3759-3768, 2011).

In a particular embodiment, the FDCA-based polymer processed according to the method of the present invention is a furanoic polyester prepared by reacting FDCA and at least one diol. The diol may be petroleum-derived or bio-based. These polyesters can be synthesized using polytransesterification or direct polycondensation techniques well-known in the art. The diol component of the furanoic polyester may be, for example, an aliphatic or cycloaliphatic $C_3$-$C_{10}$ diol.

Representative, non-limiting diol components of the furanoic polyester used to form the preform and container of the present invention include ethylene diol, 1,3-propane diol; 1,4-butane diol; 1,6-hexane diol; 1,8-octane diol; D-isosorbide; D-isoidide; bis(2,5-hydroxymethyl)-furan; bis-(1,4-hydroxymethyl) benzene; methanediol and hydroquinone.

In a particular embodiment, the furanoic polyester used to produce the preforms and containers of the present invention has an FDCA component and an ethylene diol component, i.e., PEF. PEF is characterized by a repeat unit chemical having a molecular weight of 182.2 g/mol:

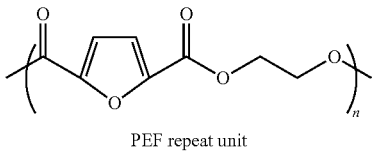

PEF repeat unit

PEF used to produce the preforms and the containers of the present invention may be a homopolymers or copolymers of PEF. Representative, non-limiting, comonomers of PEF includeisophthalic acid, terepthalic acid, propanediol, butanediol, 5-sulfoisophthalic acid, diethylene glycol, triethylene glycol, cyclohexane dimethanol, cyclobutane dicarboxylic acid, isosorbide. In a particular embodiment, the FDCA polymer processed according to the method of the present invention is furan-2,5-dimethanol.

In exemplary embodiments, the FDCA polymer is an FDCA-based polymer. In exemplary embodiments, the polymer has at least about 50 wt. %, or at least about 70 wt. %, or at least about 75 wt. %, or at least about 80 wt. %, or at least about 85 wt. % or at least about 90 wt. % FDCA relative to the total weight of polymer, for example.

Preform

Many plastic containers, such as PET containers, are made by first forming the polymer resin into a suitable preform by injection molding and then stretch blow molding the preform. Although FDCA has been suggested as a substitute for TA component of PET, it has been surprisingly determined that a conventional PET processing methods cannot be applied to PEF in the production of stretch blow molded containers. FIGS. 1 and 7-10 are illustrative embodiments of the preforms of the present invention.

The preform of the present invention comprises FDCA and at least one diol, which may be petroleum-based or bio-based. In exemplary embodiments, the preform comprises FDA and ethylene glycol, or more particularly, petroleum-based on bio-based ethylene glycol. Biomass sources of ethylene glycol or other suitable diols include, but are not limited to, sugar cane, corn, agricultural waste and the like.

The preform of the present invention may vary in weight. In one embodiment, the weight of the preform is between about 10 and about 30 grams, or more particularly, about 10 and about 25 grams, about 10 and about 20 grams, or about 10 and about 15 grams.

In exemplary embodiments, the weight of the preform is about 10, about 11, about 12, about 13, about 14, or about 15 grams.

In exemplary embodiments, the weight of the preform is about 20, about 21, about 22, about 23, about 24 or about 25 grams.

The dimensions of the preform may also vary, including the body length, the body thickness, the end cap body inside diameter, the encap tip thickness, the neck height, the label panel height and the base height.

In exemplary embodiments, the body length is between about 20 and about 400 mm.

In exemplary embodiments, the body length is about 25, about 30, about 35, about 40, about 45, about 50, about 55, about 60, about 65, about 70, about 75, about 80, about 85, about 90, about 100, about 105, about 110, about 115, about 120 or about 126 mm.

In exemplary embodiments, the body length is about 130, about 140, about 150, about 160, about 170, about 180, about 190, about 200, about 210, about 220, about 230, about 240, about 250, about 260, about 270, abut 280, about 290, about 300, about 310, about 320, about 330, about 340, about 350, about 360, about 370, about 380, about 390 or about 400 mm or more.

Example 5 describes stretch blow molding of a conventional preform, Specifically, Example 5 indicates that viable stretch blow molding conditions could not be determined for a conventional preform (i.e., a 2.2 axial ratio preform) over a range of preform heating profiles, molding preblow and blow pressures, and inflation rates and times.

Without being bound by any particular theory, this inability to conventionally process PEF resins similar to conventional PET resins is believed to be attributable to the crystallization kinetics and entanglement molecular weight ($M_e$) of PEF, which has been determined to differ from PET in conjunction with the present invention. In particular, the entanglement molecular weight of PEF is about 40% higher than the entanglement molecular weight of PET, reflecting a significantly diminished entanglement density.

The crystallization half-time (t½) of PET over a temperature range of about 195° C. to about 210° C. has been shown to range from about 50 to about 235 seconds (See Kim et al, Journal of Applied Polymer Science, Vol. 67, 1383-1392 (1998)). The average value of the Avrami exponent, n, is about 2.8 (See Huang et al., Journal of Polymer Science Part B: Polymer Physics Volume 38, Issue 7, pages 934-941, 1 Apr. 2000. As shown in Example 1, differential scanning calorimetry (DSC) studies of PEF establish that the isothermal and non-isotheral quiescent crystallization kinetics of PEF are significantly slower than for PET at comparable molecular weights.

Relative entanglement of the two polymers has also been found to differ. The entanglement molecular weight ($M_e$) for amorphous PET is about 1,450 g/mol (See Fetters et al. *Physical Properties of Polymers Handbook*, Second Ed., Chapter 25, 445-452 (2006)). As shown in Example 2, however, the $M_e$, of PEF is shown to range from about 2,900 g/mol to about 3,710 g/mol. As such, neat PEF is shown to have a significant lower entanglement than PET.

The present invention provides a novel preform to permit processing of furanoic polyester resins into containers, taking into account the unique characteristics of such resins.

To maximize the performance characteristics of a particular polymer, the preform design must be such that the preform overall stretch ratio is greater than the natural stretch ratio of the polymer. Biaxial stretching trials of injection molded PEF plaques were conducted to determine the natural stretch ratios of PEF, as shown in Example 3. At stretching temperatures ranging from 100 to 110° C. and equibiaxial stretch ratios ranging from 2.5×2.5 to 4.0×4.0 giving overall (areal) stretch ratios from about 6.3 to 16.

The overall stretch ratio of the preform is calculated as (maximum internal container diameter/internal preform diameter)]×[height of container below finish)/(height of preform below finish)].

Thus, in one embodiment, the present invention is a preform comprising a polymer comprising a diol component (e.g., ethylene glycol) and an FDCA component, wherein the overall stretch ratio of the preform is greater than the natural stretch ratio of the polymer. FIGS. 7-10 illustrates embodiments of the preform of the present invention.

In exemplary embodiments, the present invention is a preform comprising a polymer comprising a diol component (e.g., ethylene glycol) and an FDCA component, wherein the overall stretch ratio of the preform is about 5%, about 10%, about 15%, about 20%, about 25%, about 30%, about 35%, about 40%, about 45%, about 50% greater than the natural stretch ratio of the polymer.

In exemplary embodiments, the present invention is a preform comprising a polymer comprising a diol component (e.g., ethylene glycol) and an FDCA component, wherein the overall stretch ratio of the preform is between about 11 and about 30, about 12 and about 28, about 14 and about 26, about 16 and about 24, about 14 and about 16, about 16 and about 18.

In exemplary embodiments, the present invention is a preform comprising a polymer comprising a diol component (e.g., ethylene glycol) and an FDCA component, wherein the preform has an overall stretch ratio between about 6.5 to about 8, from about 8 to about 10, from about 10 to about 12, from about 12 to about 14, from about 14 to about 16, from about 16 to about 20 or from about 20 to about 30.

In exemplary embodiments, the present invention is a preform comprising a polymer comprising a diol component (e.g., ethylene glycol) and an FDCA component, wherein the overall stretch ratio of the preform is about 7, about 8, about 9, about 10, 11, about 12, about 13, about 14, about 15, about 16, about 17, about 18, about 19, about 20, about 21, about 22, about 23, about 24, about 25, about 26, about 27, about 28, about 29 or about 30.

In a particular embodiment, the present invention is a PEF preform having an overall stretch ratio of between about 6.5 to about 8, about 8 to about 10, about 10 to about 12, about 12 to about 14, about 14 to about 16, about 16 to about 20, about 20 to about 22, about 22 to about 24, about 24 to about 26, about 26 to about 28 or about 28 to about 20 to about 30.

In a particular embodiment, the present invention is a PEF preform having an overall stretch ratio of the preform is about 7, about 8, about 9, about 10, 11, about 12, about 13, about 14, about 15, about 16, about 17, about 18, about 19, about 20, about 21, about 22, about 23, about 24, about 25, about 26, about 27, about 28, about 29 or about 30.

In exemplary embodiments, the present invention is a preform comprising a polymer comprising a diol component (e.g., ethylene glycol) and an FDCA component, wherein the overall stretch ratio of the preform is at least 11, at least 12, at least 13, at least 14, at least 15, at least 16, at least 17, at least 18, at least 19, at least 20, at least 21, at least 22, at least 23, at least 24, at least 25, at least 26, at least 27 or at least 28.

In a particular embodiment, the present invention is a PEF preform having an overall stretch ratio of at least 11, at least 12, at least 13, at least 14, at least 15, at least 16, at least 17, at least 18, at least 19, at least 20, at least 21, at least 22, at least 23, at least 24, at least 25, at least 26, at least 27 or at least 28.

In exemplary embodiments, the present invention is a preform comprising a polymer comprising a diol component (e.g., ethylene glycol) and an FDCA component, wherein the preform has (i) a hoop stretch ratio between about 2.6 and about 8.2 and (ii) an axial stretch ratio of between about 2.0 and about 5.0. In certain embodiments, the diol component is ethylene glycol.

In a preferred embodiment, the present invention is a preform comprising a polymer comprising a diol component (e.g., ethylene glycol) and an FDCA component, wherein the preform has(i) a hoop stretch ratio between about 5.2 and about 7.2 and (ii) an axial stretch ratio of between about 2.3 and about 3.3. In certain embodiments, the diol component is ethylene glycol.

In exemplary embodiments, the present invention is a preform comprising a polymer comprising a diol component (e.g., ethylene glycol) and an FDCA component, wherein the preform has(i) a hoop stretch ratio between about 5.2 and about 7.2, and more particularly, about 5.2, about 5.3, about 5.4, about 5.4, about 5.6, about 5.7, about 5.8, about 5.9, about 6.0, about 6.1, about 6.2, about 6.3, about 6.4, about 6.5, about 6.6, about 6.7, about 6.8, about 6.9, about 7.1 or about 7.2, and (ii) an axial stretch ratio of between about 2.3 and about 3.3, or more particularly, about 2.3, about 2.4, about 2.5, about 2.6, about 2.7, about 2.8, about 2.9, about 3.0, about 3.1, about 3.2 or about 3.3. In certain embodiments, the diol component is ethylene glycol.

In exemplary embodiments, the present invention is a preform comprising a polymer comprising a diol component (e.g., ethylene glycol) and an FDCA component, wherein the preform has (i) a hoop stretch ratio of between about 3.5 and about 5.3 and (ii) an axial stretch ratio of between about 3 and about 4.

In exemplary embodiments, the present invention is a PEF preform having a hoop stretch ratio between about 5.35 and about 5.45 and an axial stretch ratio between about 3.2 and about 3.35.

In a preferred embodiment, the present invention is a preform comprising a polymer comprising a diol component (e.g., ethylene glycol) and an FDCA component, wherein the overall stretch ratio of the preform is between about 7 and about 30, or more particularly, about 10 and about 20, or more particularly, about 14 and about 18, about 15 and about 18, about 16 or about 18, and wherein the hoop stretch ratio is between about 2.6 and about 8.2, or more particularly, about 5.2 and about 7.2, and the axial stretch ratio is between about 2.0 and about 5.0, or more particularly, about 2.3 and about 3.3.

In a preferred embodiment, the present invention is a preform comprising a polymer comprising a diol component (e.g., ethylene glycol) and an FDCA component, wherein the overall stretch ratio of the preform is between about 7 and about 30, or more particularly, about 10 and about 20, or more particularly, about 14 and about 18, about 15 and about 18, about 16 or about 18, and wherein the hoop stretch ratio is between about 3.5 and about 5.5 and wherein the axial stretch ratio is between about 3 and about 4.

In another preferred embodiment, the present invention is a preform comprising a polymer comprising a diol component (e.g., ethylene glycol) and an FDCA component, wherein the overall stretch ratio of the preform is about 14.5, about 15, about 15.5, about 16, about 16.5, about 17, or about 17.5, and wherein (i) the hoop stretch ratio is between about 2.6 and about 8.2, more particularly, about 5.2 and about 7.2, even more particularly, about 3.5 and about 5.3; or about 5.35; and the axial stretch ratio is about between about 2.0 and about 5.0, or more particularly, about 3 and about 4, or even more particularly, about 2.3 and 3.3, or about 3.2.

In exemplary embodiments, the present invention is a preform comprising a polymer comprising a diol component (e.g., ethylene glycol) and an FDCA component, wherein the hoop stretch ratio is about 6.2 and the axial stretch ratio is about 2.8 at high hoop stretch.

In exemplary embodiments, the present invention is a preform comprising a polymer comprising a diol component (e.g., ethylene glycol) and an FDCA component, wherein the hoop stretch ratio is about 4.3 and the axial stretch ratio is about 3.55 at low hoop stretch.

Figure 14:
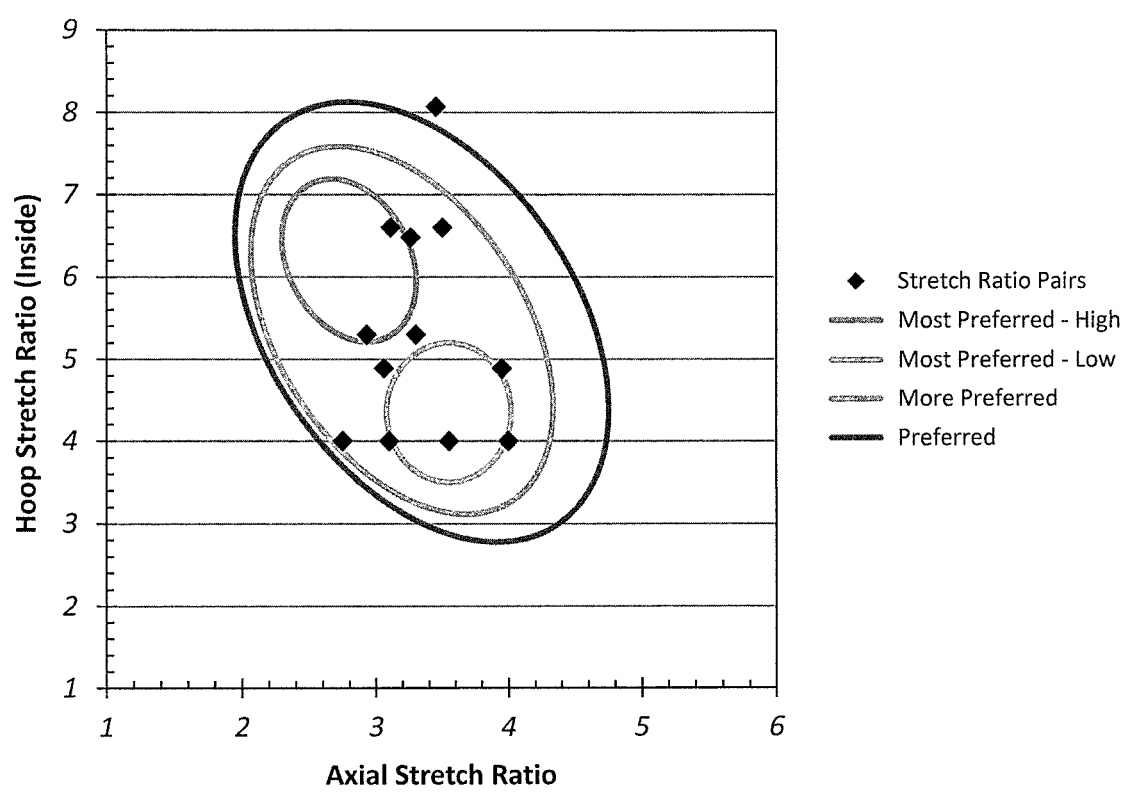
FIG. 14: Experimental design for preform study showing elliptical distributions for preferred, more preferred and most preferred bifurcated regimes for low axial, high hoop stretch ratio and high axial, low hoop stretch ratio preform designs.

In a preferred embodiment, the present invention is a preform comprising a polymer comprising a diol component (e.g., ethylene glycol) and an FDCA component, wherein (i) the axial ratio coordinate (abscissa) offset is about 3.35; (ii) the inside hoop ratio coordinate (ordinate) offset is about 5.45; (iii) the major axis radius is about 2.75; (iv) the minor axis radius is about 1.25; and (v) the major axis rotation relative to axial stretch ratio abscissa is about −75° C. (−1.31 radians). The blue elliptical regions shown in the plot in FIG. 14 correspond to this embodiment.

In a particularly preferred embodiment, the present invention is a preform comprising a polymer comprising a diol component (e.g., ethylene glycol) and an FDCA component, wherein (i) the axial ratio coordinate (abscissa) offset is about 3.2; (ii) the inside hoop ratio coordinate (ordinate) offset is about 5.35; (iii) the major axis radius is about 2.30; (iv) the minor axis radius is about 1.0; and (v) the major axis rotation relative to axial stretch ratio abscissa is about −75° C. (−1.31 radians). The green elliptical regions shown in the plot in FIG. 14 correspond to this embodiment.

In a preferred embodiment, the present invention is a preform comprising a polymer comprising a diol component (e.g., ethylene glycol) and an FDCA component, wherein at high hoop stretch, (i) the axial ratio coordinate (abscissa) offset is about 2.80; (ii) the inside hoop ratio coordinate (ordinate) offset is about 6.20; (iii) the major axis radius is about 1.0; (iv) the minor axis radius is about 0.48; and (v) the major axis rotation relative to axial stretch ratio abscissa is about −80° (−1.40 radians). The red elliptical regions shown in the plot in FIG. 14 correspond to this embodiment.

In a preferred embodiment, the present invention is a preform comprising a polymer comprising a diol component (e.g., ethylene glycol) and an FDCA component, wherein at low hoop stretch, (i) the axial ratio coordinate (abscissa) offset is about 3.55; (ii) the inside hoop ratio coordinate (ordinate) offset is about 4.35; (iii) the major axis radius is about 0.85; (iv) the minor axis radius is about 0. 47; and (v) the major axis rotation relative to axial stretch ratio abscissa is about −80° (−1.40 radians). The brown elliptical regions shown in the plot in FIG. 14 correspond to this embodiment.

Figure 1B:
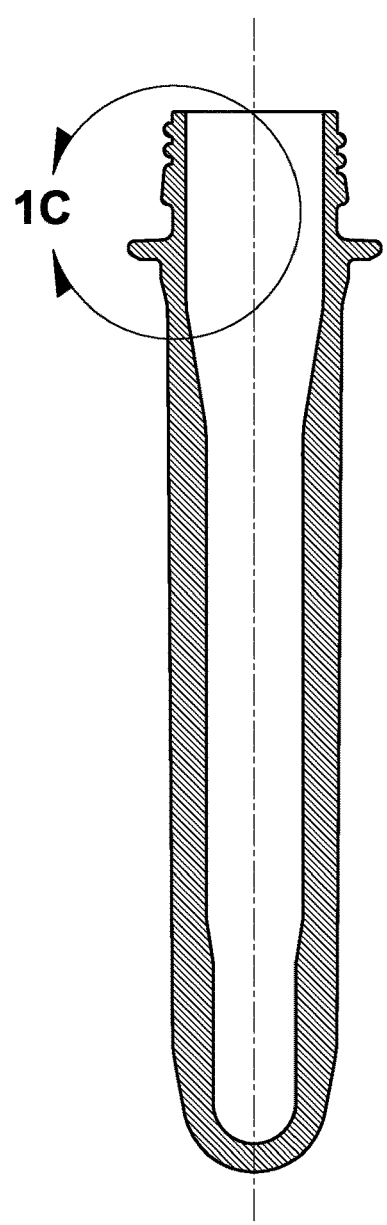
Figure 1C:
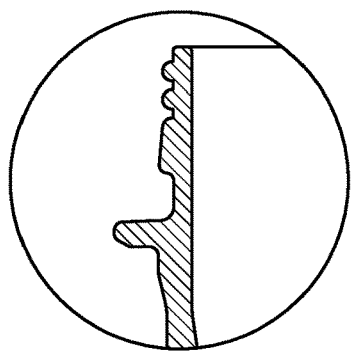
Figure 2C:
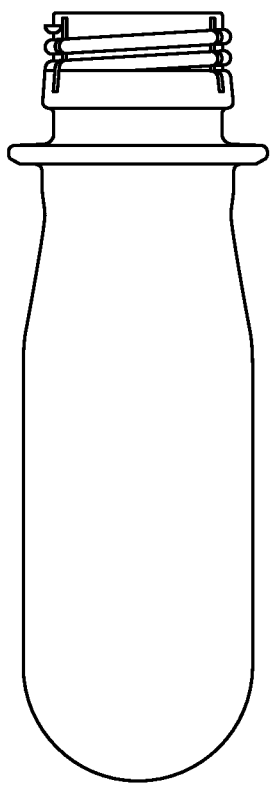
FIG. 2: Is a sectional view of an injection molded preform having a conventional configuration.
Figure 2C:
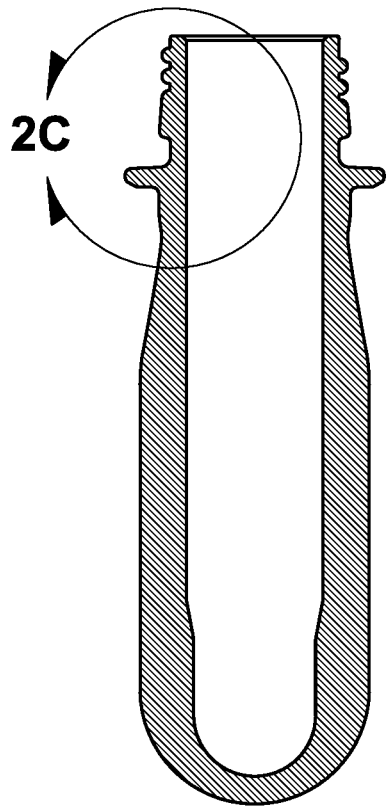
Figure 2C:
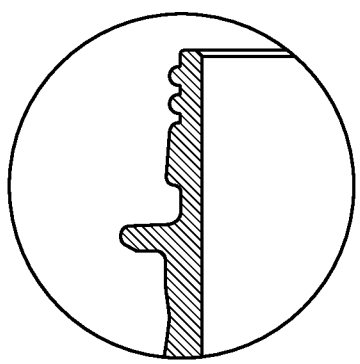

FIG. 1 illustrates an embodiment of a conventional preform 5 while FIG. 2, illustrates an embodiment of the preform of the present invention 10. While both preforms possess the same basic components, they differ in fundamental ways. Common to both preforms are a threated neck finish 12 and a capping flange 14, where below the capping flange 14, there is a generally cylindrical section 16 which terminates in a section 18 of gradually decreasing external diameter so as to provide for an increasing wall thickness, below this section 18 there is an elongated body section 20, wherein the height of the preform is measured from the capping flange 14 to a closed end 21 of the elongated body section 20. Notably, the preform in FIG. 1 is significantly greater than the length of the preform shown in FIG. 2. Additional information on the dimensions and properties of the preforms having the configuration shown in FIGS. 1 and 2 are given in Example 5.

In exemplary embodiments, the preform of the present invention comprises a diol component (e.g., ethylene glycol) and an FDCA component (i.e., is produced from an FDCA polyester), wherein the preform has a length of between about 30 mm to about 400 mm, or more particularly 30 mm to about 250 mm.

In one embodiment, the preform of the present invention comprises a diol component (e.g., ethylene glycol) and an FDCA component, wherein the preform has a length of between about 20 to about 25, about 25 to about 30, 30 to about 35, about 40 to about 45, about 40 to about 50, about 50 to about 60, about 60 to about 70, about 70 to about 80, about 80 to about 90, about 90 to about 100, about 100 to about 110, about 110 to about 120, about 120 to about 130, about 130 to about 140, about 140 to about 150, about 150 to about 160, about 160 to about 170, about 170 to about 180, about 180 to about 190, about 190 to about 200, about 200 to about 210, about 210 to about 220, about 220 to about 230, about 230 to about 240, or about 240 to about 250 mm.

In a particular embodiment, the preform of the present invention comprises a diol component (e.g., ethylene glycol) and an FDCA component, wherein the preform has a length of between about 104 and about 106, about 106 and about 108, about 108 and about 110, about 110 and about 112, about 112 and about 114, about 114 and about 116, about 116 and about 118, about 118 or about 120.

In a more particular embodiment, the preform of the present invention comprises a diol component (e.g., ethylene glycol) and an FDCA component, wherein the preform has a length of about 110 mm and a finished length of about 88 mm.

In one embodiment, the preform of the present invention comprises PEF and has a length of between about 30 mm to about 400 mm, or more particularly, about 30 mm to about 250 mm.

In a particular embodiment, the preform of the present invention comprises PEF and has a length of between about 30 to about 40, about 40 to about 50, about 50 to about 60, about 60 to about 70, about 70 to about 80, about 80 to about 90, about 90 to about 100, about 100 to about 110, about 110 to about 120, about 120 to about 130, about 130 to about 140, about 140 to about 150, about 150 to about 160, about 160 to about 170, about 170 to about 180, about 180 to about 190, about 190 to about 200, about 200 to about 210, about 210 to about 220, about 220 to about 230, about 230 to about 240, or about 240 or about 250 mm.

In a specific embodiment, the preform of the present invention comprises PEF and has a length of between about 104 and about 106, about 106 and about 108, about 108 and about 110, about 110 and about 112, about 112 and about 114, about 114 and about 116, about 116 and about 118, about 118 or about 120.

In a more specific embodiment, the preform of the present invention comprises PEF and has a length of about 110 and a finished length of about 88 mm.

In another embodiment, the preform of the present invention comprises a diol component (e.g., ethylene glycol) and an FDCA component, wherein the preform has an inside length to diameter (l/d) ratio of between about 1.05 and about 25.0.

In a particular embodiment, the preform of the present invention comprises a diol component (e.g., ethylene glycol) and an FDCA component, wherein the preform has an inside l/d ratio of between about 1.05 and about 2.0, about 2.0 and about 3.0, about 3.0 and about 3.5, about 3.5 to about 4.0, about 4.0 and about 5.0, about 5.0 and about 6.0, about 6.0 and about 7.0, about 7.0 and about 8.0, about 8.0 and about 9.0, about 10.0 and about 11.0, about 11.0 and about 12.0, about 12.0 and about 13.0, about 13.0 and about 14.0, about 14.0 and about 15.0, about 15.0 and about 16.0, about 16.0 and about 17.0, about 17.0 and about 18.0, about 18.0 and about 19.0, about 19.0 and about 20.0, about 21.0 and about 22.0, about 22.0 and about 23.0, about 23.0 and about 24.0, and about 24.0 or about 25.0.

In a particular embodiment, the preform has an inside l/d ratio of about 3 to about 6, or more particularly, about 3, about 4, about 5, or about 6.

In a more particular embodiment, the preform of the present invention comprises a diol component (e.g., ethylene glycol) and an FDCA component, wherein the preform has an inside l/d ratio of between about 4 and about 5.

In a specific embodiment, the preform of the present invention comprises a diol component (e.g., ethylene glycol) and has an inside l/d ratio of about 4.37.

In another specific embodiment, the preform of the present invention comprises a diol component (e.g., ethylene glycol) and has an inside l/d ratio of about 3.07.

In another specific embodiment, the preform of the present invention comprises a diol component (e.g., ethylene glycol) and has an inside l/d ratio of about 4.24.

In another specific embodiment, the preform of the present invention comprises a diol component (e.g., ethylene glycol) and has an inside l/d ratio of about 4.9.

In another specific embodiment, the preform of the present invention comprises a diol component (e.g., ethylene glycol) and has an inside l/d ratio of about 5.57.

In another specific embodiment, the preform of the present invention comprises a diol component (e.g., ethylene glycol) and has an inside l/d ratio of about 13.

In another embodiment, the preform of the present invention comprises PEF and has an inside length to diameter (l/d) ratio of between about 1.05 and about 25.0.

In a particular embodiment, the preform of the present invention PEF and has an inside l/d ratio of between about 1.05 and about 2.0, about 2.0 and about 3.0, about 3.0 and about 4.0, about 4.0 and about 5.0, about 5.0 and about 6.0, about 6.0 and about 7.0, about 7.0 and about 8.0, about 8.0 and about 9.0, about 10.0 and about 11.0, about 11.0 and about 12.0, about 12.0 and about 13.0, about 13.0 and about 14.0, about 14.0 and about 15.0, about 15.0 and about 16.0, about 16.0 and about 17.0, about 17.0 and about 18.0, about 18.0 and about 19.0, about 19.0 and about 20.0, about 21.0 and about 22.0, about 22.0 and about 23.0, about 23.0 and about 24.0, and about 24.0 or about 25.0.

In a more particular embodiment, the preform of the present invention comprises PEF and has an inside l/d ratio of between about 4 and about 5.

In a specific embodiment, the preform of the present invention comprises PEF and has an inside l/d ratio of about 4.37.

In another specific embodiment, the preform of the present invention comprises PEF and has an inside l/d ratio of about 13.

The preform of the present invention comprises a diol component (e.g., ethylene glycol) and an FDCA component (i.e., is produced from an FDCA polyester), wherein the preform has (i) a length of between about 30 mm to about 250 mm and an inside l/d ratio of about 1.05 to about 25.0.

In one embodiment, the preform of the present invention comprises a diol component (e.g., ethylene glycol) and an FDCA component, wherein the preform has (i) a length of between about 30 to about 40, about 40 to about 50, about 50 to about 60, about 60 to about 70, about 70 to about 80, about 80 to about 90, about 90 to about 100, about 100 to about 110, about 110 to about 120, about 120 to about 130, about 130 to about 140, about 140 to about 150, about 150 to about 160, about 160 to about 170, about 170 to about 180, about 180 to about 190, about 190 to about 200, about 200 to about 210, about 210 to about 220, about 220 to about 230, about 230 to about 240, or about 240 to about 250 mm and (ii) an inside l/d ratio of between about 1.05 and about 2.0, about 2.0 and about 3.0, about 3.0 and about 4.0, about 4.0 and about 5.0, about 5.0 and about 6.0, about 6.0 and about 7.0, about 7.0 and about 8.0, about 8.0 and about 9.0, about 10.0 and about 11.0, about 11.0 and about 12.0, about 12.0 and about 13.0, about 13.0 and about 14.0, about 14.0 and about 15.0, about 15.0 and about 16.0, about 16.0 and about 17.0, about 17.0 and about 18.0, about 18.0 and about 19.0, about 19.0 and about 20.0, about 21.0 and about 22.0, about 22.0 and about 23.0, about 23.0 and about 24.0, or about 24.0 or about 25.0.

In a particular embodiment, the preform of the present invention comprises a diol component (e.g., ethylene glycol) and an FDCA component, wherein the preform has (i) a length of between about 104 and about 106, about 106 and about 108, about 108 and about 110, about 110 and about 112, about 112 and about 114, about 114 and about 116, about 116 and about 118, about 118 or about 120 and (ii) an internal l/d ratio of about 4 to about 5.

In a more particular embodiment, the preform of the present invention comprises a diol component (e.g., ethylene glycol) and an FDCA component, wherein the preform has (i) a length of about 110 mm; (ii) a finished length of about 88 mm; and (ii) an internal l/d ratio of about 4.37.

The preform of the present invention comprises PEF and has a length of between about 30 mm to about 250 mm and an inside l/d ratio of about 1.05 to about 25.0.

In one embodiment, the preform of the present invention comprises PEF and has (i) a length of between about 30 to about 40, about 40 to about 50, about 50 to about 60, about 60 to about 70, about 70 to about 80, about 80 to about 90, about 90 to about 100, about 100 to about 110, about 110 to about 120, about 120 to about 130, about 130 to about 140, about 140 to about 150, about 150 to about 160, about 160 to about 170, about 170 to about 180, about 180 to about 190, about 190 to about 200, about 200 to about 210, about 210 to about 220, about 220 to about 230, about 230 to about 240, or about 240 to about 250 mm and (ii) an inside l/d ratio of between about 1.05 and about 2.0, about 2.0 and about 3.0, about 3.0 and about 4.0, about 4.0 and about 5.0, about 5.0 and about 6.0, about 6.0 and about 7.0, about 7.0 and about 8.0, about 8.0 and about 9.0, about 10.0 and about 11.0, about 11.0 and about 12.0, about 12.0 and about 13.0, about 13.0 and about 14.0, about 14.0 and about 15.0, about 15.0 and about 16.0, about 16.0 and about 17.0, about 17.0 and about 18.0, about 18.0 and about 19.0, about 19.0 and about 20.0, about 21.0 and about 22.0, about 22.0 and about 23.0, about 23.0 and about 24.0, or about 24.0 or about 25.0.

In a particular embodiment, the preform of the present invention comprises PEF and has (i) a length of between about 104 and about 106, about 106 and about 108, about 108 and about 110, about 110 and about 112, about 112 and about 114, about 114 and about 116, about 116 and about 118, about 118 or about 120 and (ii) an internal l/d ratio of about 4 to about 5.

In a more particular embodiment, the preform of the present invention comprises PEF and has (i) a length of about 110 mm; (ii) a finished length of about 88 mm; and (ii) an internal l/d ratio of about 4.37.

The intrinsic viscosity of the resin and the preform may vary.

In one embodiment, the preform of the present invention comprises a diol component (e.g., ethylene glycol) and an FDCA component and has an IV of between about 0.750 dL/g and about 0.780 dL/g.

In a particular embodiment, the preform of the present invention comprises a diol component (e.g., ethylene glycol) and an FDCA component and has an IV of between about 0.763 dL/g.

In a specific embodiment, the preform of the present invention comprises PEF and has an IV of between about 0.750 dL/g and about 0.780 dL/g.

In another specific embodiment, the preform of the present invention comprises PEF and has an IV of between about 0.763 dL/g.

In another specific embodiment, the preform of the present invention comprises PEF and has an IV of between about 0.80 and about 0.840, or more particularly, about 0.80 and about 0.830 dL/g.

In yet another specific embodiment, the preform of the present invention comprises PEF and has an IV of between about 0.80 and about 0.95, or more particularly, about 0.83 and about 0.92.

In exemplary embodiments, the preform of the present invention comprises FDCA and a diol, where the diol may be petroleum-based or bio-based, wherein the preform has (i) a hoop stretch ratio of between about 2.6 and about 8.2, more particularly, about 5.2 and about 7.2, even more particularly, about 3.5 and about 5.3; and (ii) an axial stretch ratio of between about 2.0 and about 5.0, more particularly about 3 and about 4, even more particularly, between about 2.3 and about 3.3; (iii) a length of between about 20 and about 400 mm; and (iii) an I.V. between about 0.80 and about 0.95, more particularly, about 0.83 and about 0.92.

Methods of Making Preforms

As described above, plastic containers such as PET containers are generally made by first forming the plastic resin into a suitable preform (e.g., by injection molding), and then stretch blow molding the preform to form a container.

In exemplary embodiments, the PEF polymer or resin, as described, above, is utilized to form preforms. FIGS. 1, and 7-10, above, illustrate embodiments of the preform of the present invention.

The FDCA polymer resin may be any suitable FDCA polymer resin, including those furanoic polyester resins described above in Section I, including PEF. The resin may be provided in any suitable form including, for example, a pellet or powder.

In exemplary embodiments, thee resin is heated to provide a melt and then introduced into an injection molding device, where the material takes the shape of the mold, is cooled and then released to provide a preform.

In one embodiment, a PEF melt is injected into the a molding cavity defined, at least in part, by a female cavity piece and a male core piece mounted respectively on a cavity plate and a core plate of a mold. The cavity plate and the core plate are urged together and are held together by clamp force, the clamp force being sufficient to keep the cavity and the core pieces together against the pressure of the injected PEF material. The molding cavity has a shape that substantially corresponds to a final cold-state shape of the molded article to be molded.

The so-injected PEF material is then cooled to a temperature sufficient to enable ejection of the so-formed molded article from the mold. When cooled, the molded article shrinks inside of the molding cavity and, as such, when the cavity and core plates are urged apart, the molded article tends to remain associated with the core piece. Thereafter, the molded article is then ejected off of the core piece by use of one or more ejection structures. Ejection structures are known to assist in removing the molded articles from the core halves. Examples of the ejection structures include stripper plates, stripper rings and neck rings, ejector pins, etc.

The shear rate is less than about 100,000 $s^{-1}$. In one embodiment, the shear rate is between about 5,000 and about 40,000, about 5,000 and about 30,000 or about 5,000 and about 20,000 $s^{-1}$. In a particular embodiment, the sheer rate is about 8,000-15,000 $s^{-1}$.

In one embodiment, the present is a process for producing a preform, comprising (i) providing a melt comprising a diol component (e.g., ethylene glycol) and an FDCA component; and (ii) injection molding the melt to produce an preform, wherein the preform has (i) a hoop stretch ratio is between about 2.6 and about 8.2, more particularly, about 5.2 and about 7.2, and even more particularly, about 3.5 and about 5.3; and (ii) an axial stretch ratio of between about 2.0 and about 5.0, more particularly, about 3 and about 4, even more particularly, about 2.3 and about 3.3.

In another embodiment, the present invention is a process for producing a preform, comprising (i) providing a melt comprising a diol component (e.g., ethylene glycol) and an FDCA component; and (ii) injection molding the melt to produce an preform, wherein the preform has (i) a hoop stretch ratio is between about 2.6 and about 8.2, more particularly, about 5.2 and about 7.2, and even more particularly, about 3.5 and about 5.3; (ii) an axial stretch ratio of between about 2.0 and about 5.0, more particularly, about 3 and about 4, even more particularly, about 2.3 and about 3.3; and (iii) a length of between about 20 mm to about 400 mm, or more particularly about 30 mm to about 250 mm.

In a particular embodiment, the present invention is a process for producing a preform, comprising (i) providing a melt comprising a diol component (e.g., ethylene glycol) and an FDCA component; and (ii) injection molding the melt to produce an preform, wherein the preform has (i) a hoop stretch ratio is between about 2.6 and about 8.2, more particularly, about 5.2 and about 7.2, and even more particularly, about 3.5 and about 5.3; (ii) an axial stretch ratio of between about 2.0 and about 5.0, more particularly, about 3 and about 4, even more particularly, about 2.3 and about 3.3; and (iii) a length of between about 30 to about 40, about 40 to about 50, about 50 to about 60, about 60 to about 70, about 70 to about 80, about 80 to about 90, about 90 to about 100, about 100 to about 110, about 110 to about 120, about 120 to about 130, about 130 to about 140, about 140 to about 150, about 150 to about 160, about 160 to about 170, about 170 to about 180, about 180 to about 190, about 190 to about 200, about 200 to about 210, about 210 to about 220, about 220 to about 230, about 230 to about 240, or about 240 to about 250 mm, about 250 to about 300 mm, or about 300 mm to about 400 mm.

In a particular embodiment, the present invention is a process for producing a preform, comprising (i) providing a melt comprising a diol component (e.g., ethylene glycol) and an FDCA component; and (ii) injection molding the melt to produce an preform, wherein the preform of the present invention comprises a diol component (e.g., ethylene glycol) and an FDCA component, wherein the preform has a length of between about 104 and about 106, about 106 and about 108, about 108 and about 110, about 110 and about 112, about 112 and about 114, about 114 and about 116, about 116 and about 118, about 118 or about 120.

In a more particular embodiment, the present invention is a process for producing a preform, comprising (i) providing a melt comprising a diol component (e.g., ethylene glycol) and an FDCA component; and (ii) injection molding the melt to produce a preform, wherein the preform has a length of about 110 mm and a finished length of about 88 mm.

In another embodiment, the present invention is a process for producing a preform, comprising (i) providing a melt comprising PEF; and (ii) injection molding the melt to produce a preform, wherein the preform has a length of between about 30 mm to about 250 mm.

In a particular embodiment, the present invention is a process for producing a preform, comprising (i) providing a melt comprising PEF; and (ii) injection molding the melt to produce a preform, wherein the preform has a length of between about 30 to about 40, about 40 to about 50, about 50 to about 60, about 60 to about 70, about 70 to about 80, about 80 to about 90, about 90 to about 100, about 100 to about 110, about 110 to about 120, about 120 to about 130, about 130 to about 140, about 140 to about 150, about 150 to about 160, about 160 to about 170, about 170 to about 180, about 180 to about 190, about 190 to about 200, about 200 to about 210, about 210 to about 220, about 220 to about 230, about 230 to about 240, or about 240 to about 250 mm.

In a more particular embodiment, the present invention is a process for producing a preform, comprising (i) providing a melt comprising PEF; and (ii) injection molding the melt to produce a preform, wherein the preform has a has a length of between about 104 and about 106, about 106 and about 108, about 108 and about 110, about 110 and about 112, about 112 and about 114, about 114 and about 116, about 116 and about 118, about 118 or about 120.

In an even more particular embodiment, the present invention is a process for producing a preform, comprising (i) providing a melt comprising PEF; and (ii) injection molding the melt to produce a preform, wherein the preform has a length of about 110 and a finished length of about 88 mm.

In another embodiment, the present invention is a process for producing a preform, comprising (i) providing a melt comprising a diol component (e.g., ethylene glycol) and an FDCA component; and (ii) injection molding the melt to produce an preform, wherein the preform has an inside length to diameter (l/d) ratio of between about 1.05 and about 25.0.

In a particular embodiment, the present invention is a process for producing a preform, comprising (i) providing a melt comprising a diol component (e.g., ethylene glycol) and an FDCA component; and (ii) injection molding the melt to produce an preform, wherein the preform has an inside l/d ratio of between about 1.05 and about 2.0, about 2.0 and about 3.0, about 3.0 and about 4.0, about 4.0 and about 5.0, about 5.0 and about 6.0, about 6.0 and about 7.0, about 7.0 and about 8.0, about 8.0 and about 9.0, about 10.0 and about 11.0, about 11.0 and about 12.0, about 12.0 and about 13.0, about 13.0 and about 14.0, about 14.0 and about 15.0, about 15.0 and about 16.0, about 16.0 and about 17.0, about 17.0 and about 18.0, about 18.0 and about 19.0, about 19.0 and about 20.0, about 21.0 and about 22.0, about 22.0 and about 23.0, about 23.0 and about 24.0, and about 24.0 or about 25.0.

In a more particular embodiment, the present invention is a process for producing a preform, comprising (i) providing a melt comprising a diol component (e.g., ethylene glycol) and an FDCA component; and (ii) injection molding the melt to produce an preform, wherein the preform has, wherein the preform has an inside l/d ratio of between about 3 to about 6, or more particularly, about 4 and about 5.

In a more particular embodiment, the present invention is a process for producing a preform, comprising (i) providing a melt comprising a diol component (e.g., ethylene glycol) and an FDCA component; and (ii) injection molding the melt to produce an preform, wherein the preform has an inside l/d ratio of about 4.37.

In a more particular embodiment, the present invention is a process for producing a preform, comprising (i) providing a melt comprising a diol component (e.g., ethylene glycol) and an FDCA component; and (ii) injection molding the melt to produce an preform, wherein the preform has an inside l/d ratio of about 13.

In another embodiment, the present invention is a process for producing a preform, comprising (i) providing a melt comprising PEF; and (ii) injection molding the melt to produce a preform having an inside length to diameter (l/d) ratio of between about 1.05 and about 25.0.

In a particular embodiment, the present invention is a process for producing a preform, comprising (i) providing a melt comprising PEF; and (ii) injection molding the melt to produce a preform having inside l/d ratio of between about 1.05 and about 2.0, about 2.0 and about 3.0, about 3.0 and about 4.0, about 4.0 and about 5.0, about 5.0 and about 6.0, about 6.0 and about 7.0, about 7.0 and about 8.0, about 8.0 and about 9.0, about 10.0 and about 11.0, about 11.0 and about 12.0, about 12.0 and about 13.0, about 13.0 and about 14.0, about 14.0 and about 15.0, about 15.0 and about 16.0, about 16.0 and about 17.0, about 17.0 and about 18.0, about 18.0 and about 19.0, about 19.0 and about 20.0, about 21.0 and about 22.0, about 22.0 and about 23.0, about 23.0 and about 24.0, and about 24.0 or about 25.0.

In a more particular embodiment, the present invention is a process for producing a preform, comprising (i) providing a melt comprising PEF; and (ii) injection molding the melt to produce a preform an inside l/d ratio of between about 3 to about 6.0, or about 4 and about 5.

In an even more particular embodiment, the present invention is a process for producing a preform, comprising (i) providing a melt comprising PEF; and (ii) injection molding the melt to produce a preform having an inside l/d ratio of about 4.37.

In a further particular embodiment, the present invention is a process for producing a preform, comprising (i) providing a melt comprising PEF; and (ii) injection molding the melt to produce a preform having an inside l/d ratio of 13.

In another embodiment, the present invention is a process for producing a preform, comprising (i) providing a melt comprising a diol component (e.g., ethylene glycol) and an FDCA component and (ii) injection molding the melt to produce a preform having (i) a length of between about 30 mm to about 250 mm and an inside l/d ratio of about 1.05 to about 25.0.

In a particular embodiment, the present invention is a process for producing a preform, comprising (i) providing a melt comprising a diol component (e.g., ethylene glycol) and an FDCA component and (ii) injection molding the melt to produce a preform having (a) a length of between about 30 to about 40, about 40 to about 50, about 50 to about 60, about 60 to about 70, about 70 to about 80, about 80 to about 90, about 90 to about 100, about 100 to about 110, about 110 to about 120, about 120 to about 130, about 130 to about 140, about 140 to about 150, about 150 to about 160, about 160 to about 170, about 170 to about 180, about 180 to about 190, about 190 to about 200, about 200 to about 210, about 210 to about 220, about 220 to about 230, about 230 to about 240, or about 240 to about 250 mm and (b) an inside l/d ratio of between about 1.05 and about 2.0, about 2.0 and about 3.0, about 3.0 and about 4.0, about 4.0 and about 5.0, about 5.0 and about 6.0, about 6.0 and about 7.0, about 7.0 and about 8.0, about 8.0 and about 9.0, about 10.0 and about 11.0, about 11.0 and about 12.0, about 12.0 and about 13.0, about 13.0 and about 14.0, about 14.0 and about 15.0, about 15.0 and about 16.0, about 16.0 and about 17.0, about 17.0 and about 18.0, about 18.0 and about 19.0, about 19.0 and about 20.0, about 21.0 and about 22.0, about 22.0 and about 23.0, about 23.0 and about 24.0, or about 24.0 or about 25.0.

In another particular embodiment, the present invention is a process for producing a preform, comprising (i) providing a melt comprising a diol component (e.g., ethylene glycol) and an FDCA component and (ii) injection molding the melt to produce a preform having (i) a length of between about 104 and about 106, about 106 and about 108, about 108 and about 110, about 110 and about 112, about 112 and about 114, about 114 and about 116, about 116 and about 118, about 118 or about 120 and (ii) an internal l/d ratio of about 4 to about 5.

In yet another particular embodiment, the present invention is a process for producing a preform, comprising (i) providing a melt comprising a diol component (e.g., ethylene glycol) and an FDCA component and (ii) injection molding the melt to produce a preform having (i) a length of about 110 mm; (ii) a finished length of about 88 mm; and (ii) an internal l/d ratio of about 4.37.

In another embodiment, the present invention is a process for producing a preform, comprising (i) providing a melt comprising PEF and (ii) injection molding the melt to produce a preform having a length of between about 30 mm to about 250 mm and an inside l/d ratio of about 1.05 to about 25.0.

In another embodiment, the present invention is a process for producing a preform, comprising (i) providing a melt comprising PEF and (ii) injection molding the melt to produce a preform having (a) a length of between about 30 to about 40, about 40 to about 50, about 50 to about 60, about 60 to about 70, about 70 to about 80, about 80 to about 90, about 90 to about 100, about 100 to about 110, about 110 to about 120, about 120 to about 130, about 130 to about 140, about 140 to about 150, about 150 to about 160, about 160 to about 170, about 170 to about 180, about 180 to about 190, about 190 to about 200, about 200 to about 210, about 210 to about 220, about 220 to about 230, about 230 to about 240, or about 240 to about 250 mm and (b) an inside l/d ratio of between about 1.05 and about 2.0, about 2.0 and about 3.0, about 3.0 and about 4.0, about 4.0 and about 5.0, about 5.0 and about 6.0, about 6.0 and about 7.0, about 7.0 and about 8.0, about 8.0 and about 9.0, about 10.0 and about 11.0, about 11.0 and about 12.0, about 12.0 and about 13.0, about 13.0 and about 14.0, about 14.0 and about 15.0, about 15.0 and about 16.0, about 16.0 and about 17.0, about 17.0 and about 18.0, about 18.0 and about 19.0, about 19.0 and about 20.0, about 21.0 and about 22.0, about 22.0 and about 23.0, about 23.0 and about 24.0, or about 24.0 or about 25.0.

In another particular embodiment, the present invention is a process for producing a preform, comprising (i) providing a melt comprising PEF; and (ii) injection molding the melt to produce a preform having (a) a length of between about 104 and about 106, about 106 and about 108, about 108 and about 110, about 110 and about 112, about 112 and about 114, about 114 and about 116, about 116 and about 118, about 118 or about 120 and (b) an internal l/d ratio of about 4 to about 5.

In another particular embodiment, the present invention is a process for producing a preform, comprising (i) providing a melt comprising PEF; and (ii) injection molding the melt to produce a preform having (a) a length of about 110 mm; (b) a finished length of about 88 mm; and (ii) an internal l/d ratio of about 4.37.

In another embodiment, the present invention is a process for producing a preform, comprising (i) providing a melt comprising a diol component (e.g., ethylene glycol) and an FDCA component; and (ii) injection molding the melt to produce a preform having an IV of between about 0.750 dL/g and about 0.780 dL/g.

In a particular embodiment, the present invention is a process for producing a preform, comprising (i) providing a melt comprising a diol component (e.g., ethylene glycol) and an FDCA component; and (ii) injection molding the melt to produce a preform having an IV of about 0.763 dL/g.

In another embodiment, the present invention is a process for producing a preform, comprising (i) providing a melt comprising PEF; and (ii) injection molding the melt to produce a preform having IV of between about 0.750 dL/g and about 0.780 dL/g.

In a particular embodiment, the present invention is a process for producing a preform, comprising (i) providing a melt comprising PEF; and (ii) injection molding the melt to produce a preform having IV of about 0.763 dL/g.

In another embodiment, the present invention is a process for producing a preform, comprising (i) providing a melt comprising a diol component (e.g., ethylene glycol) and an FDCA component; and (ii) injection molding the melt to produce a preform having an IV of between about 0.750 dL/g and about 0.780 dL/g and a length between about 30 mm and about 250 mm.

In a particular embodiment, the present invention is a process for producing a preform, comprising (i) providing a melt comprising a diol component (e.g., ethylene glycol) and an FDCA component; and (ii) injection molding the melt to produce a preform having an IV of between about 0.750 dL/g and about 0.780 dL/g and a length between about 105 mm and about 120 mm.

In another particular embodiment, the present invention is a process for producing a preform, comprising (i) providing a melt comprising a diol component (e.g., ethylene glycol) and an FDCA component; and (ii) injection molding the melt to produce a preform having an IV of between about 0.750 dL/g and about 0.780 dL/g and a length of about 110 mm.

In another embodiment, the present invention is a process for producing a preform, comprising (i) providing a melt comprising a diol component (e.g., ethylene glycol) and an FDCA component; and (ii) injection molding the melt to produce a preform having (a) an IV of between about 0.750 dL/g and about 0.780 dL/; (b) a length between about 105 mm and about 120 mm; and (c) an internal l/d ratio of between about 4 and about 5.

In a particular embodiment, the present invention is a process for producing a preform, comprising (i) providing a melt comprising a diol component (e.g., ethylene glycol) and an FDCA component; and (ii) injection molding the melt to produce a preform having (a) an IV of between about 0.750 dL/g and about 0.780 dL/g; (ii) a length of about 110 mm; and (ii) an internal l/d ratio of between about 4.37.

In another embodiment, the present invention is a process for producing a preform, comprising (i) providing a melt comprising PEF; and (ii) injection molding the melt to produce a preform having an IV of between about 0.750 dL/g and about 0.780 dL/g and a length between about 30 mm and about 250 mm.

In a particular embodiment, the present invention is a process for producing a preform, comprising (i) providing a melt comprising PEF; and (ii) injection molding the melt to produce a preform having an IV of between about 0.750 dL/g and about 0.780 dL/g and (ii) a length between about 105 mm and about 120 mm.

In another particular embodiment, the present invention is a process for producing a preform, comprising (i) providing a melt comprising PEF; and (ii) injection molding the melt to produce a preform having preform of the present invention comprises PEF and has an IV of between about 0.750 dL/g and about 0.780 dL/g and a length of about 110 mm.

In a yet another particular embodiment, the present invention is a process for producing a preform, comprising (i) providing a melt comprising PEF; and (ii) injection molding the melt to produce a preform having (a) an IV of between about 0.750 dL/g and about 0.780 dL/; (b) a length between about 105 mm and about 120 mm; and (c) an internal l/d ratio of between about 4 and about 5.

In yet another particular embodiment, the present invention is a process for producing a preform, comprising (i) providing a melt comprising PEF; and (ii) injection molding the melt to produce a preform having an (a) an IV of between about 0.750 dL/g and about 0.780 dL/g; (b) a length of about 110 mm; and (c) an internal l/d ratio of between about 4.37.

In a still further embodiment, the present invention is a process for producing a preform, comprising (i) providing a melt comprising PEF; and (ii) injection molding the melt to produce a preform having (i) an IV of between about 0.750 dL/g and about 0.780 dL/g; and (ii) an internal l/d ratio of about 13.

In exemplary embodiments, the present invention is a process for producing a preform comprising (i) providing a melt comprising PEF; and (ii) injection molding the melt to produce a preform having (a) a hoop stretch ratio of between about 2.6 and about 8.2, more particularly, about 5.2 and about 7.2, even more particularly, about 3.5 and about 5.3; (ii) an axial stretch ratio of between about 2.0 and about 5.0, more particularly, about 3 and about 4, even more particularly, about 2.3 and about 3.3; (iii) a length between about 20 and about 400 mm; and (iv) an IV of between about 0.80 and about 0.95, or more particularly, about 0.83 and about 0.92.

Example 7 describes the injection molding of a preform of the present invention.

Method of Manufacturing a Container

The preform as described in Section II and III, above, is then used to produce the container of the present invention by stretch blow molding. Stretch blow molding permits the formation of hollow articles, such as bottles. Single stage, two stage, and double blow molding manufacturing systems are well known in the art.

In both processes, plastic resin is converted into containers (e.g.) by the injection molding of preforms, followed by biaxial orientation (stretching) of these preforms, either in continuous single-stage or discontinuous two-stage processes of blow molding. Orientation refers to the physical alignment of the polymer chains in a regular configuration. Biaxial orientation not only permits thinner, more uniform sidewalls and thus less expensive containers, it also enhances the containers physical properties—including enhanced physical properties, clarity, and gas barrier properties, which are all important in products such as bottles for carbonated beverages.

Preforms are conventionally formed by injection molding, in which molten resin is introduced into a mold in the desired preform shape. The molten polymer within the mold cavity must be cooled through the maximum crystallization range as quickly as possible.

In the one-stage process, preforms are injection molded, conditioned to the proper temperature, and blown into containers—all in one continuous process. In conventional one-stage processes, the heat that remains in the preform from injection molding is sufficient to permit the preform to be stretch blow molded.

In the two-stage process, preforms are injection molded, stored for a short period of time (typically 1 to 4 days), and blown into containers using a reheat-blow (RHB) machine. In the two-process, the preform must be conditioned before stretch blow molding, i.e., by reheating the preform about the glass transition temperature of the material. The preform may be heated, e.g., in an infrared oven.

Stretch blow molding generally involves three stages. In the first sage, the preform is stretch with a stretch rod. In the second stage, the preform is inflated by air at a low pressure (e.g., 0.5 to 0.9 MPa) while stretching continues. In the third stage, stretching is discontinued and pressure is increased (e.g., Map). MPa). The two first stages may be referred to as the low-blow period whereas the last may be referred to as the blowing period.

In a typical stretching process for a plastic material, very little stretching occurs initially, but if stretching continues past the yield point, the material will start to stretch and become thinner, causing permanent deformation. This is followed by a period of continued stretching, where the amount of force remains constant. Once the material has been stretched past its natural stretch ratio (NSR), a dramatic increase in force is required for additional stretching to occur. This is known as the strain-hardening period. It is during this phase that physical properties are maximized. Therefore, it is critical that the natural stretch ratio be surpassed slightly during the stretching process Three stretch ratios are used to used to determine the orientation of the material: (i) the axial stretch ratio; (ii) the hoop stretch ratio; and (iii) the overall stretch ratio (a product of axial stretch ratio and the hoop stretch ratio).

The axial stretch ratio is calculated by dividing the height of the stretched part of the bottle by the length of the stretched part of the preform. Or, alternately stated: axial stretch ratio=(height of container below finish/height of preform below finish).

The hoop stretch ratio is calculated by dividing the bottle diameter by the preform diameter. Or, alternately stated: hoop stretch ratio=(maximum internal container diameter/internal preform diameter).

The overall stretch ratio is calculated by multiplying the axial stretch ratio by the hoop stretch ratio. Or, alternately stated: Overall stretch ratio=[(maximum internal container diameter/internal preform diameter)]×[height of container below finish)/(height of preform below finish)].

In one embodiment, the preform is placed in a blow molding apparatus. The mold cavity may be heated to a temperature between approximately about 10° C. and about 115° C. A stretch rod apparatus stretches or extends the heated preform within the mold cavity to a length approximately that of the resultant container thereby molecularly orienting the polyester material in an axial direction generally corresponding with a central longitudinal axis of the resultant container. While the stretch rod extends the preform, air having a pressure between about 15 PSI and about 1000 PSI assists in extending the preform in the axial direction and in expanding the preform in a circumferential or hoop direction thereby substantially conforming the polyester material to the shape of the mold cavity and further molecularly orienting the polyester material in a direction generally perpendicular to the axial direction, thus establishing the biaxial molecular orientation of the polyester material in most of the container. Typically, material within the finish and a sub-portion of the base are not substantially molecularly oriented. The pressurized air holds the mostly biaxial molecularly oriented polyester material against the mold cavity for a period of between about 0.05 to about 5 seconds before removal of the container from the mold cavity.

The resulting blown container has the same neck finish with outer threads and lowermost neck flange as the preform. The remainder of the bottle undergoes expansion, although to varying degrees. A removable cap is attached to the open upper end of the container. The cap includes a base portion having internal threads which engage the outer threads on the neck finish.

Strain-induced crystallinity results from the rapid mechanical deformation of PEF, and generates extremely small, transparent crystallites. The amount of crystallinity present in the container sidewall correlates with the strength and barrier performance of the container.

In one embodiment, the present invention is a process for producing a container, comprising (i) providing a preform comprising a diol component (e.g., ethylene glycol) and an FDCA component, wherein the preform wherein the preform has (a) a hoop stretch ratio is from about 2.6 to about 8.2, more particularly, about 5.2 to about 7.2, even more particularly, about 2.5 to about 5.3, or about 5.35 to about 5.45, or about 5.35; and (b) an axial stretch ratio is from about 2.0 to about 5.0, more particularly, about 3 to about 4, even more particularly, about 2.3 to about 3.3, or about 3.2 to about 3.35, or more particularly, about 3.2; and (ii) stretch blow molding the preform into a container, wherein the container is a food or beverage container, such as a beverage bottle.

In one embodiment, the present invention is a process for producing a container, comprising (i) providing a preform comprising a diol component (e.g., ethylene glycol) and an FDCA component, wherein the preform has a length of between about 30 mm and about 250 mm; and (ii) stretch blow molding the preform into a container.

In a particular embodiment, the present invention is a process for producing a container, comprising (i) providing a preform comprising a diol component (e.g., ethylene glycol) and an FDCA component, wherein the preform has a length of between about 30 mm and about 250 mm; and (ii) stretch blow molding the preform into a container, wherein the container is a food or beverage container, such as a beverage bottle.

In another particular embodiment, the present invention is a process for producing a container, comprising (i) providing a preform comprising a diol component (e.g., ethylene glycol) and an FDCA component, wherein the preform has a length of has a length of between about 30 to about 40, about 40 to about 50, about 50 to about 60, about 60 to about 70, about 70 to about 80, about 80 to about 90, about 90 to about 100, about 100 to about 110, about 110 to about 120, about 120 to about 130, about 130 to about 140, about 140 to about 150, about 150 to about 160, about 160 to about 170, about 170 to about 180, about 180 to about 190, about 190 to about 200, about 200 to about 210, about 210 to about 220, about 220 to about 230, about 230 to about 240, or about 240 to about 250 mm and (ii) stretch blow molding the preform into a container, such as a beverage bottle.

In specific embodiment, the present invention is a process for producing a container, comprising (i) providing a preform comprising a diol component (e.g., ethylene glycol) and an FDCA component, wherein the preform has a length of between about 30 to about 40, about 40 to about 50, about 50 to about 60, about 60 to about 70, about 70 to about 80, about 80 to about 90, about 90 to about 100, about 100 to about 110, about 110 to about 120, about 120 to about 130, about 130 to about 140, about 140 to about 150, about 150 to about 160, about 160 to about 170, about 170 to about 180, about 180 to about 190, about 190 to about 200, about 200 to about 210, about 210 to about 220, about 220 to about 230, about 230 to about 240, or about 240 to about 250 mm and (ii) stretch blow molding the preform into a container, wherein the container is a food or beverage container, such as a beverage bottle.

In another particular embodiment, the present invention is a process for producing a container, comprising (i) providing a preform comprising a diol component (e.g., ethylene glycol) and an FDCA component, wherein the preform has a length of between about 104 and about 106, about 106 and about 108, about 108 and about 110, about 110 and about 112, about 112 and about 114, about 114 and about 116, about 116 and about 118, about 118 or about 120 mm; and (ii) stretch blow molding the preform into a container.

In specific embodiment, the present invention is a process for producing a container, comprising (i) providing a preform comprising a diol component (e.g., ethylene glycol) and an FDCA component, wherein the preform has a length of between about 104 and about 106, about 106 and about 108, about 108 and about 110, about 110 and about 112, about 112 and about 114, about 114 and about 116, about 116 and about 118, about 118 or about 120 mm; and (ii) stretch blow molding the preform into a container, wherein the container is a food or beverage container, such as a beverage bottle.

In another particular embodiment, the present invention is a process for producing a container, comprising (i) providing a preform comprising a diol component (e.g., ethylene glycol) and an FDCA component, wherein the preform has a length of about 110 mm and a finished length of about 88 mml and (ii) stretch blow molding the preform into a container.

In specific embodiment, the present invention is a process for producing a container, comprising (i) providing a preform comprising a diol component (e.g., ethylene glycol) and an FDCA component, wherein the preform wherein the preform has a length of about 110 mm and a finished length of about 88 mml and (ii) stretch blow molding the preform into a container, wherein the container is a food or beverage container, such as a beverage bottle.

In another particular embodiment, the present invention is a process for producing a container, comprising (i) providing a preform comprising PEF, wherein the preform has a length of between about 30 mm to about 250 mm; and (ii) stretch blow molding the preform into a container.

In specific embodiment, the present invention is a process for producing a container, comprising (i) providing a preform comprising PEF, wherein the preform has a length of between about 30 mm to about 250 mm; and (ii) stretch blow molding the preform into a container, wherein the container is a food or beverage container, such as a bottle.

In another particular embodiment, the present invention is a process for producing a container, comprising (i) providing a preform comprising PEF, wherein the preform has a length of between about 30 to about 40, about 40 to about 50, about 50 to about 60, about 60 to about 70, about 70 to about 80, about 80 to about 90, about 90 to about 100, about 100 to about 110, about 110 to about 120, about 120 to about 130, about 130 to about 140, about 140 to about 150, about 150 to about 160, about 160 to about 170, about 170 to about 180, about 180 to about 190, about 190 to about 200, about 200 to about 210, about 210 to about 220, about 220 to about 230, about 230 to about 240, or about 240 or about 250 mm; and (ii) stretch blow molding the preform into a container.

In specific embodiment, the present invention is a process for producing a container, comprising (i) providing a preform comprising PEF, wherein the preform has a length of between about 30 to about 40, about 40 to about 50, about 50 to about 60, about 60 to about 70, about 70 to about 80, about 80 to about 90, about 90 to about 100, about 100 to about 110, about 110 to about 120, about 120 to about 130, about 130 to about 140, about 140 to about 150, about 150 to about 160, about 160 to about 170, about 170 to about 180, about 180 to about 190, about 190 to about 200, about 200 to about 210, about 210 to about 220, about 220 to about 230, about 230 to about 240, or about 240 or about 250 mm; and (ii) stretch blow molding the preform into a container, wherein the container is a food or beverage container, such as a beverage bottle.

In another particular embodiment, the present invention is a process for producing a container, comprising (i) providing a preform comprising PEF, wherein the preform has a length of between about 104 and about 106, about 106 and about 108, about 108 and about 110, about 110 and about 112, about 112 and about 114, about 114 and about 116, about 116 and about 118, about 118 or about 120; and (ii) stretch blow molding the preform into a container.

In specific embodiment, the present invention is a process for producing a container, comprising (i) providing a preform comprising PEF, wherein the preform has a length of between about 104 and about 106, about 106 and about 108, about 108 and about 110, about 110 and about 112, about 112 and about 114, about 114 and about 116, about 116 and about 118, about 118 or about 120; and (ii) stretch blow molding the preform into a container, wherein the container is a food or beverage container, such as a beverage bottle.

In another particular embodiment, the present invention is a process for producing a container, comprising (i) providing a preform comprising PEF, wherein the preform has a length of has a length of about 110 and a finished length of about 88 mm; and (ii) stretch blow molding the preform into a container.

In specific embodiment, the present invention is a process for producing a container, comprising (i) providing a preform comprising PEF, wherein the preform has a length of has a length of about 110 and a finished length of about 88 mm; and (ii) stretch blow molding the preform into a container, wherein the container is a food or beverage container, such as a food or beverage container.

In another embodiment, the present invention is a process for producing a container, comprising (i) providing a preform comprising a diol component and an FDCA component, wherein the preform has an inside length to diameter (l/d) ratio of between about 1.05 and about 25.0; and (ii) stretch blow molding the preform into a container.

In specific embodiment, the present invention is a process for producing a container, comprising (i) providing a preform comprising a diol component and an FDCA component wherein the preform has an inside length to diameter (l/d) ratio of between about 1.05 and about 25.0; and (ii) stretch blow molding the preform into a container, wherein the container is a food or beverage container.

In another embodiment, the present invention is a process for producing a container, comprising (i) providing a preform comprising a diol component and an FDCA component, wherein the preform has an inside length to diameter (l/d) ratio of between about wherein the preform has an inside l/d ratio of between about 1.05 and about 2.0, about 2.0 and about 3.0, about 3.0 and about 4.0, about 4.0 and about 5.0, about 5.0 and about 6.0, about 6.0 and about 7.0, about 7.0 and about 8.0, about 8.0 and about 9.0, about 10.0 and about 11.0, about 11.0 and about 12.0, about 12.0 and about 13.0, about 13.0 and about 14.0, about 14.0 and about 15.0, about 15.0 and about 16.0, about 16.0 and about 17.0, about 17.0 and about 18.0, about 18.0 and about 19.0, about 19.0 and about 20.0, about 21.0 and about 22.0, about 22.0 and about 23.0, about 23.0 and about 24.0, and about 24.0 or about 25.0; and (ii) stretch blow molding the preform into a container.

In specific embodiment, the present invention is a process for producing a container, comprising (i) providing a preform comprising a diol component and an FDCA component, wherein the preform has an inside length to diameter (l/d) ratio of between about wherein the preform has an inside l/d ratio of between about 1.05 and about 2.0, about 2.0 and about 3.0, about 3.0 and about 4.0, about 4.0 and about 5.0, about 5.0 and about 6.0, about 6.0 and about 7.0, about 7.0 and about 8.0, about 8.0 and about 9.0, about 10.0 and about 11.0, about 11.0 and about 12.0, about 12.0 and about 13.0, about 13.0 and about 14.0, about 14.0 and about 15.0, about 15.0 and about 16.0, about 16.0 and about 17.0, about 17.0 and about 18.0, about 18.0 and about 19.0, about 19.0 and about 20.0, about 21.0 and about 22.0, about 22.0 and about 23.0, about 23.0 and about 24.0, and about 24.0 or about 25.0; and (ii) stretch blow molding the preform into a container, wherein the container is a food or beverage container, such as a beverage bottle.

In another embodiment, the present invention is a process for producing a container, comprising (i) providing a preform comprising a diol component and an FDCA component, wherein the preform has an inside l/d ratio of between about 4 and about 5 and (ii) stretch blow molding the preform into a container.

In a specific embodiment, the present invention is a process for producing a container, comprising (i) providing a preform comprising a diol component and an FDCA component, wherein the preform has an inside l/d ratio of between about 4 and about 5 and (ii) stretch blow molding the preform into a container, wherein the container is a food or beverage container, such as a beverage bottle.

In another embodiment, the present invention is a process for producing a container, comprising (i) providing a preform comprising a diol component and an FDCA component, wherein the preform has an inside l/d ratio of between about 4.37 and (ii) stretch blow molding the preform into a container.

In a specific embodiment, the present invention is a process for producing a container, comprising (i) providing a preform comprising a diol component and an FDCA component, wherein the preform has an inside l/d ratio of between about 4.37 and (ii) stretch blow molding the preform into a container, wherein the container is a food or beverage container, such as a beverage bottle.

In another embodiment, the present invention is a process for producing a container, comprising (i) providing a preform comprising a diol component and an FDCA component, wherein the preform has an inside l/d ratio of between about 13 and (ii) stretch blow molding the preform into a container.

In a specific embodiment, the present invention is a process for producing a container, comprising (i) providing a preform comprising a diol component and an FDCA component, wherein the preform has an inside l/d ratio of between about 13 and (ii) stretch blow molding the preform into a container, wherein the container is a food or beverage container, such as a bottle.

In another embodiment, the present invention is a process for producing a container, comprising (i) providing a preform comprising PEF, wherein the preform has an inside length to diameter (l/d) ratio of between about 1.05 and about 25.0; and (ii) stretch blow molding the preform into a container.

In specific embodiment, the present invention is a process for producing a container, comprising (i) providing a preform comprising PEF, wherein the preform has an inside length to diameter (l/d) ratio of between about 1.05 and about 25.0; and (ii) stretch blow molding the preform into a container, wherein the container is a food or beverage container.

In another embodiment, the present invention is a process for producing a container, comprising (i) providing a preform comprising PEF, wherein the preform has an inside length to diameter (l/d) ratio of between about wherein the preform has an inside l/d ratio of between about 1.05 and about 2.0, about 2.0 and about 3.0, about 3.0 and about 4.0, about 4.0 and about 5.0, about 5.0 and about 6.0, about 6.0 and about 7.0, about 7.0 and about 8.0, about 8.0 and about 9.0, about 10.0 and about 11.0, about 11.0 and about 12.0, about 12.0 and about 13.0, about 13.0 and about 14.0, about 14.0 and about 15.0, about 15.0 and about 16.0, about 16.0 and about 17.0, about 17.0 and about 18.0, about 18.0 and about 19.0, about 19.0 and about 20.0, about 21.0 and about 22.0, about 22.0 and about 23.0, about 23.0 and about 24.0, and about 24.0 or about 25.0; and (ii) stretch blow molding the preform into a container.

In specific embodiment, the present invention is a process for producing a container, comprising (i) providing a preform comprising PEF, wherein the preform has an inside length to diameter (l/d) ratio of between about wherein the preform has an inside l/d ratio of between about 1.05 and about 2.0, about 2.0 and about 3.0, about 3.0 and about 4.0, about 4.0 and about 5.0, about 5.0 and about 6.0, about 6.0 and about 7.0, about 7.0 and about 8.0, about 8.0 and about 9.0, about 10.0 and about 11.0, about 11.0 and about 12.0, about 12.0 and about 13.0, about 13.0 and about 14.0, about 14.0 and about 15.0, about 15.0 and about 16.0, about 16.0 and about 17.0, about 17.0 and about 18.0, about 18.0 and about 19.0, about 19.0 and about 20.0, about 21.0 and about 22.0, about 22.0 and about 23.0, about 23.0 and about 24.0, and about 24.0 or about 25.0; and (ii) stretch blow molding the preform into a container, wherein the container is a food or beverage container, such as a beverage bottle.

In another embodiment, the present invention is a process for producing a container, comprising (i) providing a preform comprising PEF, wherein the preform has an inside l/d ratio of between about 4 and about 5 and (ii) stretch blow molding the preform into a container.

In a specific embodiment, the present invention is a process for producing a container, comprising (i) providing a preform comprising PEF, wherein the preform has an inside l/d ratio of between about 4 and about 5 and (ii) stretch blow molding the preform into a container, wherein the container is a food or beverage container, such as a beverage bottle.

In another embodiment, the present invention is a process for producing a container, comprising (i) providing a preform PEF, wherein the preform has an inside l/d ratio of between about 4.37 and (ii) stretch blow molding the preform into a container.

In a specific embodiment, the present invention is a process for producing a container, comprising (i) providing a preform comprising PEF, wherein the preform has an inside l/d ratio of between about 4.37 and (ii) stretch blow molding the preform into a container, wherein the container is a food or beverage container, such as a beverage bottle.

In another embodiment, the present invention is a process for producing a container, comprising (i) providing a preform comprising PEF, wherein the preform has an inside l/d ratio of between about 13 and (ii) stretch blow molding the preform into a container.

In a specific embodiment, the present invention is a process for producing a container, comprising (i) providing a preform comprising PEF, wherein the preform has an inside l/d ratio of between about 13 and (ii) stretch blow molding the preform into a container, wherein the container is a food or beverage container, such as a bottle.

In another embodiment, the present invention is a process for producing a container, comprising (i) providing a preform comprising a diol component (i.e., ethylene glycol), wherein the preform having (i) a length of between about 30 mm to about 250 mm and an inside l/d ratio of about 1.05 to about 25.0; and (ii) stretch blow molding the preform into a container.

In a particular embodiment, the present invention is a process for producing a container comprising (i) providing a preform comprising a diol component (e.g., ethylene glycol) and an FDCA component, wherein the preform has (a) a length of between about 30 to about 40, about 40 to about 50, about 50 to about 60, about 60 to about 70, about 70 to about 80, about 80 to about 90, about 90 to about 100, about 100 to about 110, about 110 to about 120, about 120 to about 130, about 130 to about 140, about 140 to about 150, about 150 to about 160, about 160 to about 170, about 170 to about 180, about 180 to about 190, about 190 to about 200, about 200 to about 210, about 210 to about 220, about 220 to about 230, about 230 to about 240, or about 240 to about 250 mm and (b) an inside l/d ratio of between about 1.05 and about 2.0, about 2.0 and about 3.0, about 3.0 and about 4.0, about 4.0 and about 5.0, about 5.0 and about 6.0, about 6.0 and about 7.0, about 7.0 and about 8.0, about 8.0 and about 9.0, about 10.0 and about 11.0, about 11.0 and about 12.0, about 12.0 and about 13.0, about 13.0 and about 14.0, about 14.0 and about 15.0, about 15.0 and about 16.0, about 16.0 and about 17.0, about 17.0 and about 18.0, about 18.0 and about 19.0, about 19.0 and about 20.0, about 21.0 and about 22.0, about 22.0 and about 23.0, about 23.0 and about 24.0, or about 24.0 or about 25.0; and (ii) stretch blow molding the preform to provide a container. In a specific embodiment, the container is a food or beverage container, such as a beverage bottle.

In a particular embodiment, the present invention is a process for producing a container comprising (i) providing a preform comprising a diol component (e.g., ethylene glycol) and an FDCA component, wherein the preform has (a) a length of between about 104 and about 106, about 106 and about 108, about 108 and about 110, about 110 and about 112, about 112 and about 114, about 114 and about 116, about 116 and about 118, about 118 or about 120 and (b) an internal l/d ratio of about 4 to about 5; and (ii) stretch blow molding the preform into a container. In a specific embodiment, the container is a food or beverage container, such as a beverage bottle.

In a particular embodiment, the present invention is a process for producing a container comprising (i) providing a preform comprising a diol component (e.g., ethylene glycol) and an FDCA component, wherein the preform has (a) a length of about 110 mm; (b) a finished length of about 88 mm; and (c) an internal l/d ratio of about 4.37; and (ii) stretch blow molding the preform into a container. In a specific embodiment, the container is a food or beverage container, such as a beverage bottle.

In another particular embodiment, the present invention is a process for producing a container comprising (i) providing a preform comprising a diol component (e.g., ethylene glycol) and an FDCA component, wherein the preform has a length of between about 30 mm to about 250 mm and an inside l/d ratio of about 1.05 to about 25.0; and (ii) stretch blow molding the preform into a container. In a specific embodiment, the container is a food or beverage container, such as a beverage bottle.

In another particular embodiment, the present invention is a process for producing a container comprising (i) providing a preform comprising a diol component (e.g., ethylene glycol) and an FDCA component, wherein the preform has (a) a length of between about 30 to about 40, about 40 to about 50, about 50 to about 60, about 60 to about 70, about 70 to about 80, about 80 to about 90, about 90 to about 100, about 100 to about 110, about 110 to about 120, about 120 to about 130, about 130 to about 140, about 140 to about 150, about 150 to about 160, about 160 to about 170, about 170 to about 180, about 180 to about 190, about 190 to about 200, about 200 to about 210, about 210 to about 220, about 220 to about 230, about 230 to about 240, or about 240 to about 250 mm and (b) an inside l/d ratio of between about 1.05 and about 2.0, about 2.0 and about 3.0, about 3.0 and about 4.0, about 4.0 and about 5.0, about 5.0 and about 6.0, about 6.0 and about 7.0, about 7.0 and about 8.0, about 8.0 and about 9.0, about 10.0 and about 11.0, about 11.0 and about 12.0, about 12.0 and about 13.0, about 13.0 and about 14.0, about 14.0 and about 15.0, about 15.0 and about 16.0, about 16.0 and about 17.0, about 17.0 and about 18.0, about 18.0 and about 19.0, about 19.0 and about 20.0, about 21.0 and about 22.0, about 22.0 and about 23.0, about 23.0 and about 24.0, or about 24.0 or about 25.0; and (ii) stretch blow molding the preform into a container. In a specific embodiment, the container is a food or beverage container, such as a beverage bottle.

In yet another particular embodiment, the present invention is a process for producing a container comprising (i) providing a preform comprising a diol component (e.g., ethylene glycol) and an FDCA component, wherein the preform has (a) a length of between about 104 and about 106, about 106 and about 108, about 108 and about 110, about 110 and about 112, about 112 and about 114, about 114 and about 116, about 116 and about 118, about 118 or about 120 and (b) an internal l/d ratio of about 4 to about 5; and (ii) stretch blow molding the preform into a container. In a specific embodiment, the container is a food or beverage container, such as a beverage bottle.

In yet another particular embodiment, the present invention is a process for producing a container comprising (i) providing a preform comprising a diol component (e.g., ethylene glycol) and an FDCA component, wherein the preform has (a) a length of about 110 mm; (b) a finished length of about 88 mm; and (c) an internal l/d ratio of about 4.37; and (ii) stretch blow molding the preform into a container. In a specific embodiment, the container is a food or beverage container, such as a beverage bottle.

In another embodiment, the present invention is a process for producing a container comprising (i) providing a preform comprising a diol component (e.g., ethylene glycol) and an FDCA component, wherein the preform has a preform having an IV of between about 0.750 dL/g and about 0.780 dL/g; and (ii) stretch blow molding the preform to provide a container. In a specific embodiment, the container is a food or beverage container, such as a beverage bottle.

In another embodiment, the present invention is a process for producing a container comprising (i) providing a preform comprising a diol component (e.g., ethylene glycol) and an FDCA component, wherein the preform has a preform having an IV a preform having an IV of about 0.763 dL/g; and (ii) stretch blow molding the preform to provide a container. In a specific embodiment, the container is a food or beverage container, such as a beverage bottle.

In another embodiment, the present invention is a process for producing a container, comprising (i) providing a preform comprising PEF, wherein the preform having (i) a length of between about 30 mm to about 250 mm and an inside l/d ratio of about 1.05 to about 25.0; and (ii) stretch blow molding the preform into a container.

In a particular embodiment, the present invention is a process for producing a container comprising (i) providing a preform comprising PEF, wherein the preform has (a) a length of between about 30 to about 40, about 40 to about 50, about 50 to about 60, about 60 to about 70, about 70 to about 80, about 80 to about 90, about 90 to about 100, about 100 to about 110, about 110 to about 120, about 120 to about 130, about 130 to about 140, about 140 to about 150, about 150 to about 160, about 160 to about 170, about 170 to about 180, about 180 to about 190, about 190 to about 200, about 200 to about 210, about 210 to about 220, about 220 to about 230, about 230 to about 240, or about 240 to about 250 mm and (b) an inside l/d ratio of between about 1.05 and about 2.0, about 2.0 and about 3.0, about 3.0 and about 4.0, about 4.0 and about 5.0, about 5.0 and about 6.0, about 6.0 and about 7.0, about 7.0 and about 8.0, about 8.0 and about 9.0, about 10.0 and about 11.0, about 11.0 and about 12.0, about 12.0 and about 13.0, about 13.0 and about 14.0, about 14.0 and about 15.0, about 15.0 and about 16.0, about 16.0 and about 17.0, about 17.0 and about 18.0, about 18.0 and about 19.0, about 19.0 and about 20.0, about 21.0 and about 22.0, about 22.0 and about 23.0, about 23.0 and about 24.0, or about 24.0 or about 25.0; and (ii) stretch blow molding the preform to provide a container. In a specific embodiment, the container is a food or beverage container, such as a beverage bottle.

In a particular embodiment, the present invention is a process for producing a container comprising (i) providing a preform comprising PEF, wherein the preform has (a) a length of between about 104 and about 106, about 106 and about 108, about 108 and about 110, about 110 and about 112, about 112 and about 114, about 114 and about 116, about 116 and about 118, about 118 or about 120 and (b) an internal l/d ratio of about 4 to about 5; and (ii) stretch blow molding the preform into a container. In a specific embodiment, the container is a food or beverage container, such as a beverage bottle.

In a particular embodiment, the present invention is a process for producing a container comprising (i) providing a preform comprising PEF, wherein the preform has (a) a length of about 110 mm; (b) a finished length of about 88 mm; and (c) an internal l/d ratio of about 4.37; and (ii) stretch blow molding the preform into a container. In a specific embodiment, the container is a food or beverage container, such as a beverage bottle.

In another particular embodiment, the present invention is a process for producing a container comprising (i) providing a preform comprising PEF, wherein the preform has a length of between about 30 mm to about 250 mm and an inside l/d ratio of about 1.05 to about 25.0; and (ii) stretch blow molding the preform into a container. In a specific embodiment, the container is a food or beverage container, such as a beverage bottle.

In another particular embodiment, the present invention is a process for producing a container comprising (i) providing a preform comprising PEF, wherein the preform has (a) a length of between about 30 to about 40, about 40 to about 50, about 50 to about 60, about 60 to about 70, about 70 to about 80, about 80 to about 90, about 90 to about 100, about 100 to about 110, about 110 to about 120, about 120 to about 130, about 130 to about 140, about 140 to about 150, about 150 to about 160, about 160 to about 170, about 170 to about 180, about 180 to about 190, about 190 to about 200, about 200 to about 210, about 210 to about 220, about 220 to about 230, about 230 to about 240, or about 240 to about 250 mm and (b) an inside l/d ratio of between about 1.05 and about 2.0, about 2.0 and about 3.0, about 3.0 and about 4.0, about 4.0 and about 5.0, about 5.0 and about 6.0, about 6.0 and about 7.0, about 7.0 and about 8.0, about 8.0 and about 9.0, about 10.0 and about 11.0, about 11.0 and about 12.0, about 12.0 and about 13.0, about 13.0 and about 14.0, about 14.0 and about 15.0, about 15.0 and about 16.0, about 16.0 and about 17.0, about 17.0 and about 18.0, about 18.0 and about 19.0, about 19.0 and about 20.0, about 21.0 and about 22.0, about 22.0 and about 23.0, about 23.0 and about 24.0, or about 24.0 or about 25.0; and (ii) stretch blow molding the preform into a container. In a specific embodiment, the container is a food or beverage container, such as a beverage bottle.

In yet another particular embodiment, the present invention is a process for producing a container comprising (i) providing a preform comprising PEF, wherein the preform has (a) a length of between about 104 and about 106, about 106 and about 108, about 108 and about 110, about 110 and about 112, about 112 and about 114, about 114 and about 116, about 116 and about 118, about 118 or about 120 and (b) an internal l/d ratio of about 4 to about 5; and (ii) stretch blow molding the preform into a container. In a specific embodiment, the container is a food or beverage container, such as a beverage bottle.

In yet another particular embodiment, the present invention is a process for producing a container comprising (i) providing a preform comprising a PEF, wherein the preform has (a) a length of about 110 mm; (b) a finished length of about 88 mm; and (c) an internal l/d ratio of about 4.37; and (ii) stretch blow molding the preform into a container. In a specific embodiment, the container is a food or beverage container, such as a beverage bottle.

In another embodiment, the present invention is a process for producing a container comprising (i) providing a preform PEF, wherein the preform has a preform having an IV of between about 0.750 dL/g and about 0.780 dL/g; and (ii) stretch blow molding the preform to provide a container. In a specific embodiment, the container is a food or beverage container, such as a beverage bottle.

In another embodiment, the present invention is a process for producing a container comprising (i) providing a preform comprising PEF, wherein the preform has a preform having an IV a preform having an IV of about 0.763 dL/g; and (ii) stretch blow molding the preform to provide a container. In a specific embodiment, the container is a food or beverage container, such as a beverage bottle.

In another embodiment, invention is a process for producing a container comprising (i) providing a preform comprising a diol component (e.g., ethylene glycol) and an FDCA component, wherein the preform has an IV of between about 0.750 dL/g and about 0.780 dL/g and a length between about 30 mm and about 250 mm; and (ii) stretch blow molding the preform to provide a container. In a specific embodiment, the container is a food or beverage container, such as a beverage bottle.

In a particular embodiment, invention is a process for producing a container comprising (i) providing a preform comprising a diol component (e.g., ethylene glycol) and an FDCA component, wherein the preform has an IV of between about 0.750 dL/g and about 0.780 dL/g and a length between 105 mm and about 120 mm; and (ii) stretch blow molding the preform to provide a container. In a specific embodiment, the container is a food or beverage container, such as a beverage bottle.

In another particular embodiment, invention is a process for producing a container comprising (i) providing a preform comprising a diol component (e.g., ethylene glycol) and an FDCA component, wherein the preform has an IV of between about 0.750 dL/g and about 0.780 dL/g and a length of about 110 mm; and (ii) stretch blow molding the preform to provide a container. In a specific embodiment, the container is a food or beverage container, such as a beverage bottle.

In yet another particular embodiment, invention is a process for producing a container comprising (i) providing a preform comprising a diol component (e.g., ethylene glycol) and an FDCA component, wherein the preform has (a) an IV of between about 0.750 dL/g and about 0.780 dL/g and (b) a length of about 110 mm and (c) an internal l/d ratio of between about 4 and about 5; and (ii) stretch blow molding the preform to provide a container. In a specific embodiment, the container is a food or beverage container, such as a beverage bottle.

In another embodiment, invention is a process for producing a container comprising (i) providing a preform comprising PEF, wherein the preform has an IV of between about 0.750 dL/g and about 0.780 dL/g and a length between about 30 mm and about 250 mm; and (ii) stretch blow molding the preform to provide a container. In a specific embodiment, the container is a food or beverage container, such as a beverage bottle.

In a particular embodiment, invention is a process for producing a container comprising (i) providing a preform comprising PEF, wherein the preform has an IV of between about 0.750 dL/g and about 0.780 dL/g and a length between 105 mm and about 120 mm; and (ii) stretch blow molding the preform to provide a container. In a specific embodiment, the container is a food or beverage container, such as a beverage bottle.

In another particular embodiment, invention is a process for producing a container comprising (i) providing a preform comprising PEF, wherein the preform has an IV of between about 0.750 dL/g and about 0.780 dL/g and a length of about 110 mm; and (ii) stretch blow molding the preform to provide a container. In a specific embodiment, the container is a food or beverage container, such as a beverage bottle.

In yet another particular embodiment, invention is a process for producing a container comprising (i) providing a preform comprising PEF, wherein the preform has (a) an IV of between about 0.750 dL/g and about 0.780 dL/g and (b) a length of about 110 mm and (c) an internal l/d ratio of between about 4 and about 5; and (ii) stretch blow molding the preform to provide a container. In a specific embodiment, the container is a food or beverage container, such as a beverage bottle.

In exemplary embodiments, invention is a process for producing a container comprising (i) providing a preform comprising PEF, wherein the preform has (a) a hoop stretch ratio of about 5.0 and about 5.5, or more particularly, about 5.0, about 5.1, about 5.2, about 5.3, about 5.4 or about 5.5; (b) an axial stretch ratio between about 2.5 and about 3.5, or more particularly, about 2.5, about 2.6, about 2.7, about 2.8, about 2.9, about 3.0, about 3.1, or about 3.3.

In exemplary embodiments, invention is a process for producing a container comprising (i) providing a preform comprising PEF, wherein the preform has (a) a hoop stretch ratio of about 5.0 and about 5.5, or more particularly, about 5.0, about 5.1, about 5.2, about 5.3, about 5.4 or about 5.5; (b) an axial stretch ratio between about 2.5 and about 3.5, or more particularly, about 2.5, about 2.6, about 2.7, about 2.8, about 2.9, about 3.0, about 3.1, or about 3.3; (c) a length between about 20 about 400 mm, more particularly, about 20 and about 30, about 30 and about 35, about 35 and about 50, about 50 and about 100, about 100 and about 200, about 200 and about 250, or about 250 and about 400; and (d) an internal l/d ratio of between about 3 and about 6, more particularly about 4 and about 5; and (ii) stretch blow molding the preform to provide a container. In a specific embodiment, the container is a food or beverage container, such as a beverage bottle.

In exemplary embodiments, the present invention is a method for producing a container (e.g., a bottle) comprising (i) injection molding a resin comprising FDCA and at least one diol to provide a preform, wherein the preform has a (a) a hoop stretch ratio of between about 2.6 and about 8.2, more particularly, about 5.2 and about 7.2, even more particularly, about 3.5 and about 5.3; (b) an axial stretch ratio of between about 2.0 and about 5.0, more particularly, about 3 and about 4, even more particularly, about 2.3 and about 3.3; (c) a length between about 20 and about 400 mm; and (d) an IV of between about 0.80 and about 0.95, or more particularly, about 0.83 and about 0.92; and (ii) stretch blow molding the preform to produce a PEF container (e.g., a bottle).

In exemplary embodiments, the present invention is a method for producing a container (e.g., a bottle) comprising (i) providing a preform having (a) a hoop stretch ratio of between about 2.6 and about 8.2, more particularly, about 5.2 and about 7.2, even more particularly, about 3.5 and about 5.3; (b) an axial stretch ratio of between about 2.0 and about 5.0, more particularly, about 3 and about 4, even more particularly, about 2.3 and about 3.3; (c) a length between about 20 and about 400 mm; and (d) an IV of between about 0.80 and about 0.95, or more particularly, about 0.83 and about 0.92; and (ii) stretch blow molding the preform to produce a PEF container (e.g., a bottle).

As noted above, Example 5 describes the stretch blow molding of an exemplary preform (i.e., 3.2 axial ratio preform) of the present invention. This is in contrast, as noted above, to the unsuccessful attempt described in Example 5 to stretch blow mold a conventional preform (i.e., 2.2 axial ratio).

Surprisingly, the highest tensile modulus in the sidewall samples of the container blown from the PEF preform of the present invention is in the axial direction, which is unique to a blow molded bottle. The length of the preform can be increased to allow for less initial orientation in the axial direction, with a corresponding increase in hoop orientation and creep resistance. Also surprising is that the PEF material can be oriented even with thermal crystals, which differs from PET.

Date from free blow experiments (see Example 5) indicates an onset of hoop-direction strain hardening in the stretch ratio range of 4.5 to 5.5 at about 96° C. Taking into account the inside preform axial length and diameter, the overall stretch ratios for PEF free blown balloons exceed 25.0 at 96° C., and reach as high as 28.7, without stress whitening.

PEF surprisingly has a much broader window for stretch blow molding than PET, due to its lower entanglement density and reduce crystallinity and crystallization rate.

Containers

The method described in Section V, above, produces FDCA polymer-based containers, such as PEF containers. Suitable containers include, but are not limited to, bottles, drums, carafes, coolers, and the like. The container may be used to store any suitable contents, including but not limited to food and beverages. In a particular embodiment, the container is a hot-fill container, such as a hot-fill food or beverage container.

FIGS. 4, 11-13 illustrate embodiments of the preform of the present invention.

In one embodiment of the invention, the container is a PEF bottle. In a particular embodiment, the container is a PEF bottle used to package a beverage, such as water, juice, a carbonated beverage or beer. The PEF bottle of the present invention may be used to hot-fill beverages or food.

Figure 4:
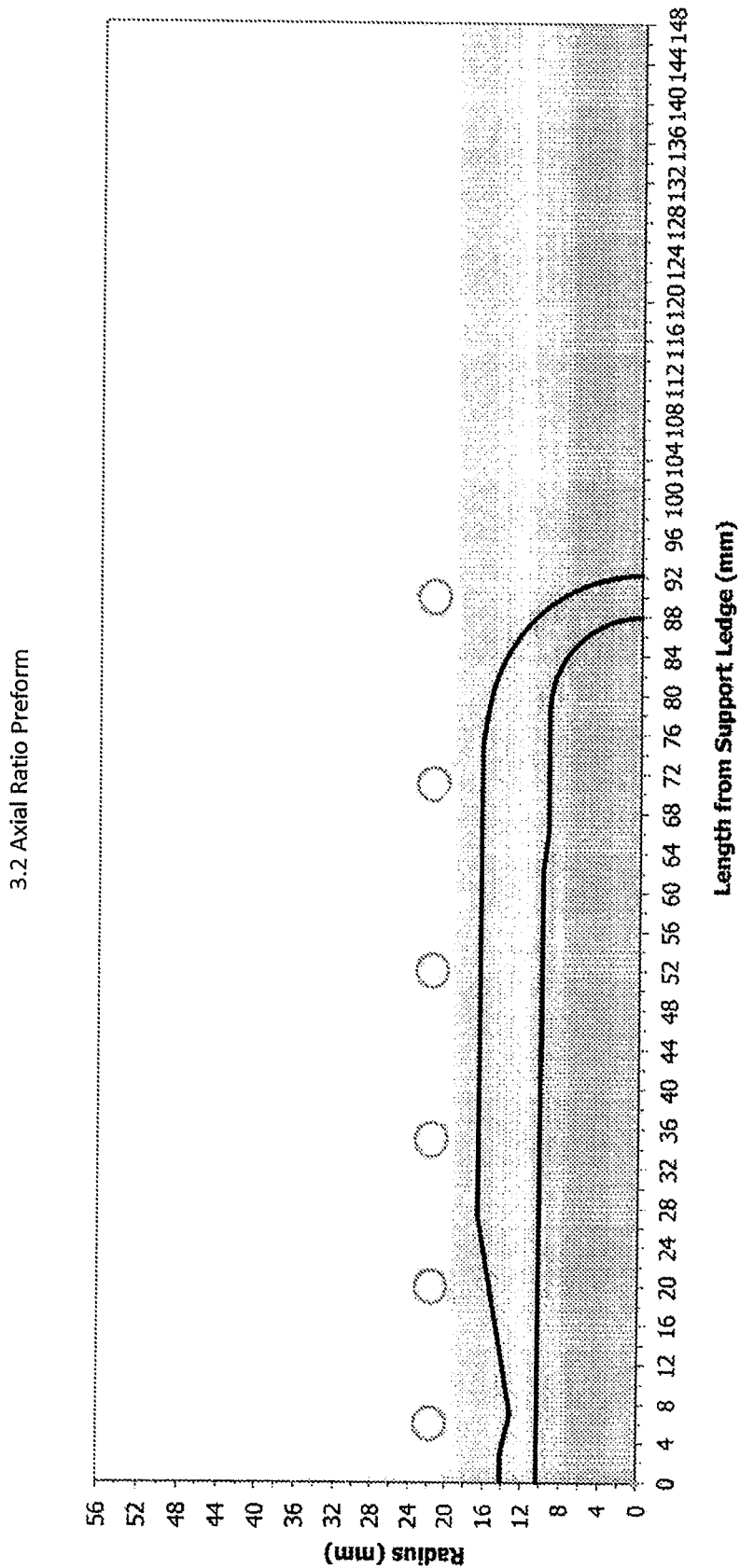
FIG. 4: shows the preform half-cross-section profile below the finish for the preform of FIG. 1.

FIG. 4 provides an exemplary embodiment of the container of the present invention, where the container 22 comprises a shell 24 comprising a threaded neck finish 26 defining a mouth 28, a capping flange=30 below the threaded neck finish, a tapered section 32 extending from the capping flange, a body section 34 extending below the tapered section, and a base 36 at the bottom of the container. The container 22 is suitably used to make a packaged beverage 38, as illustrated in FIG. 4. The packaged beverage 38 includes a beverage such as a carbonated soda beverage disposed in the container 22 and a closure 40 sealing the mouth 28 of the container.

The container of the present invention optionally may comprise a plurality of layers. In a particular embodiment, the container has two or more layers, three or more layers, four or more layers or five or more layers.

The preform 10, container 22, and packaged beverage 38 are but examples of applications using the preforms of the present disclosure. It should be understood that the process and apparatus provided herein can be used to make preforms and containers having a variety of configurations.

Advantageously, the container of the present invention is renewable but also exhibits properties similar to or superior to PET containers. These properties include thermal properties, barrier properties and other physical performance properties.

With respect to thermal properties, the glass transition temperature (Tg) of PEF is about 11° C. higher than PET, while the melting temperature (Tm) is about 40° C. lower than PET.

With respect to barrier properties, the $O_2$ barrier of the PEF container of the present invention is about 20, about 30, about 40, about 50, about 60, about 70, about 80, about 90, about 100, about 110, about 120, about 130, about 140, about 150, about 160, about 170, about 180, about 190, about 200, about 300, about 400 or about 500% better than PET. In a particular embodiment, the $O_2$ barrier of the container of the present invention about 100% times better than $O_2$ barrier of a corresponding PET container.

Similarly, the $CO_2$ barrier of the PEF container of the present invention is about 20, about 30, about 40, about 50, about 60, about 70, about 80, about 90, about 100, about 110, about 120, about 130, about 140, about 150, about 160, about 170, about 180, about 190, about 200, about 300, about 400 or about 500% better than PET. In a particular embodiment, the $CO_2$ barrier of the PEF container of the present invention is about 100% times better than the $CO_2$ barrier of a corresponding PET container.

The amount of carbon dioxide remaining in a packaged carbonated soft drink determines its shelf life. Normally, carbonated soft drink containers are filled with approximately four volumes of carbon dioxide per volume of water. It is generally accepted that a packaged carbonated soft drink reaches the end of its shelf life when 17.5 percent of the carbon dioxide in the container is lost due to permeation of the carbon dioxide through the container side wall and closure. After a bottle is filled with approximately four volumes of carbon dioxide, the bottle will slowly expand with time due to the creep of polymer molecules under pressure. The carbonation level is reduced due to the bottle expansion.

In exemplary embodiments, the PEF container has a shelf life at least five (5), at least ten (10), at least twenty (20), at least twenty five (25), at least thirty (30), at least thirty five (35), at least forty (40, at least forty five (45), at least fifty (50), at least fifty five (55), at least sixty (60), at least sixty five (65), at least seventy (70), at least seventy five (75), at least eighty (80), at least eighty five (85), at least ninety (90), at least ninety five (95) or at least hundred (100)% longer than a corresponding PET container or a PEF container made from a conventional PET preform, or more particularly, a 2.2 axial ratio preform.

In a particular embodiment, the PEF container has a shelf life that is at least one, at least two, at least two, at least three, at least four, at least five, at least six or at least seven days, one week, eight days, nine days, ten days, eleven days, twelve days, thirteen days, two weeks, fifteen days, sixteen days, seventeen days, eighteen days, nineteen days, three weeks, four weeks, five weeks, six weeks, seven weeks or eight weeks over the shelf life of a corresponding PET bottle. longer than a corresponding PET container or a PEF container made from a conventional PET preform.

In another particular embodiment, the PEF container has a shelf life that is at least one, at least two, at least three, at least four, at least five, at least six, at least seven, at least eight, at least nine, or at least ten weeks longer than a corresponding PET container or a PEF container made from a conventional PET preform.

In another particular embodiment, the PEF container has a shelf life of at least one, at least two, at least three, at least four, at least five, at least six, at least seven, at least eight, at least nine, or at least ten, at least twelve, at least fourteen, at least sixteen, at least eighteen, at least twenty, at least twenty two, at least twenty four, at least twenty six, at least twenty eight, at least about thirty, at least about 40 or at least about 50 weeks or longer.

In one embodiment, the container of the present invention is intended to contain a substance, such as a beverage, during a thermal process, typically a hot-fill process. For hot-fill bottling applications, bottlers generally fill the container with a liquid or product at an elevated temperature between approximately 68° C. to 96° C. and seal the container at the finish with the closure member or cap before cooling. In addition, the PEF container may be suitable for other high-temperature pasteurization or retort filling processes or other thermal processes as well.

The following examples are intended to illustrate rather than limit the disclosed invention.

EXAMPLES

Example 1

PEF Crystallization

|  | DSC Scan Run Date | |
| --- | --- | --- |
| PEF Sample | 1st Heat | 2nd Heat |
| PEF 785-52-01 | Jan. 27, 2011 | Feb. 1, 2011 |
| PEF | Jan. 25, 2012 | Jan. 25, 2012 |
| PEF AMAZ-2011-4 | Oct. 12, 2011; Oct. 18, 2011 | — |
| PEF Resin Batch AMAZ 2011-5 | Oct. 12, 2011 (2) | Oct. 17, 2011 |

Example 2

Determination of Entanglement Molecular Weight

Efforts were focused on confirming the entanglement density of PEF. A review of isochronal (1 Hz) dynamical mechanical data measured in tension t indicated a plateau modulus of about 3.59 MPa at 125° C. According to the Doi-Edwards relationship for the rubbery plateau shear modulus:

$$G_N^0 = \frac{4\rho RT}{5M_e} \quad (1)$$

In the case of rubbers, the plateau modulus measured in tension, $E_N^0 = 3G_N^0$, so that Equation (1) must be modified as follows:

$$E_N^0 = \frac{12\rho RT}{5M_e} \quad (2)$$

One may see results quoted in the scientific literature using the more traditional equations for the plateau modulus which neglect the 4/5 prefactor. In this case, for shear the result is:

$$G_N^0 = \frac{\rho RT}{M_e} \quad (3)$$

And for measurement in tension:

$$E_N^0 = \frac{3\rho RT}{M_e} \quad (4)$$

The entanglement molecular weight, $M_e$, using Equation (4) with dynamic mechanical analysis data measured in tension was found to be 3,710 for PEF. Separate testing in the melt at 120° C. under dynamic shear for a 0.912 dL/g PEF resin, using the procedure described below, confirmed the validity of this this value with a result of 3,550 g/mol, using Equation (3). The values obtained using Equations (2) and (1) were 3,710 g/mol and 2,970 g/mol, respectively. These values indicate the entanglement density for amorphous PEF is roughly 41% of that for amorphous PET.

Melt rheological analyses were performed for a 0.912 dL/g IV virgin PEF resin prepared from 2,5-dimethyl furanoate (PEF-DMF CH12:d01065 J v/d Visit 06-15-2012 from Avantium). The samples were melt compounded and pressed into 25-mm diameter, 2 mm thick discs. The discs were dried in a vacuum oven at 140° C. for at least 20 hours and were placed in a dessicator.

Rheological measurements were performed using a Rheometrics ARES strain-controlled rheometer using a constant strain amplitude of 3%. Temperature-frequency sweeps were conducted from high frequency to low frequency (512 rad/s to 1 rad/s) at measurement temperatures of 240, 200, 160, and 120° C. following an initial preheat of 250° C. to erase vestiges of crystallinity. The resulting data were reduced to a master curve at 120° C. using time-temperature superposition, with an Arrhenius flow activation energy of 161.0 kJ/mol ($R^2$=0.9681). The plateau modulus $G_N^0$, extracted from the minimum in the loss tangent curve, was determined to be 1.25 MPa, yielding and entanglement density $v_e$ of 0.382 mmol/cm$^3$ and an entanglement molecular weight of 3,550 g/mol using the traditional equation $G_N^0 = v_e RT$, where R is the gas constant and T is the absolute temperature. The mass density of PEF at 120° C. (393K) was calculated using the equation $\rho$ (g/cm$^3$)=1.435 exp[−6.0× 10$^{-4}$(T−298)]. $M_e$ was computed using the equation $M_e = \rho/v_e$.

Example 3

Strain Hardening of PEF Plaques

Biaxial stretching trials of injection molded PEF plaques at stretching temperatures ranging from 100 to 110° C. and equibiaxial stretch ratios ranging from 2.5×2.5 to 4.0×4.0 giving overall (areal) stretch ratios from about 6.3 to 16.

Figure 3:
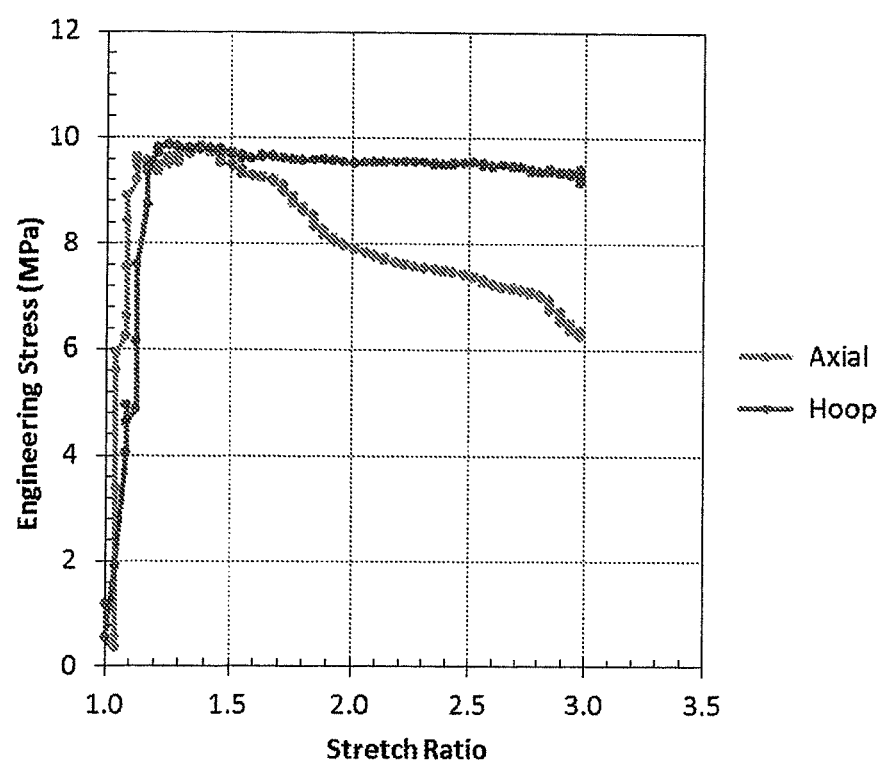
FIG. 3: A stress-strain curve for PEF to illustrate the observed lack of strain hardening or strain softening behavior as described in Example 4.

As shown in FIG. 3, biaxial stress-strain curves obtained from the PEF biaxial stretching experiments conducted at PTI indicated little to no strain hardening for the range of biaxial stretch ratios considered. In some cases, the samples exhibited strain softening during extension. These results were consistent with the view that a reduction in the entanglement density in PEF, as compared to PET, was contributing to the earlier observed volumetric creep behavior and the lack of strain hardening (and even strain softening) behavior in the biaxial stretching experiments.

Example 4

Figure 5:
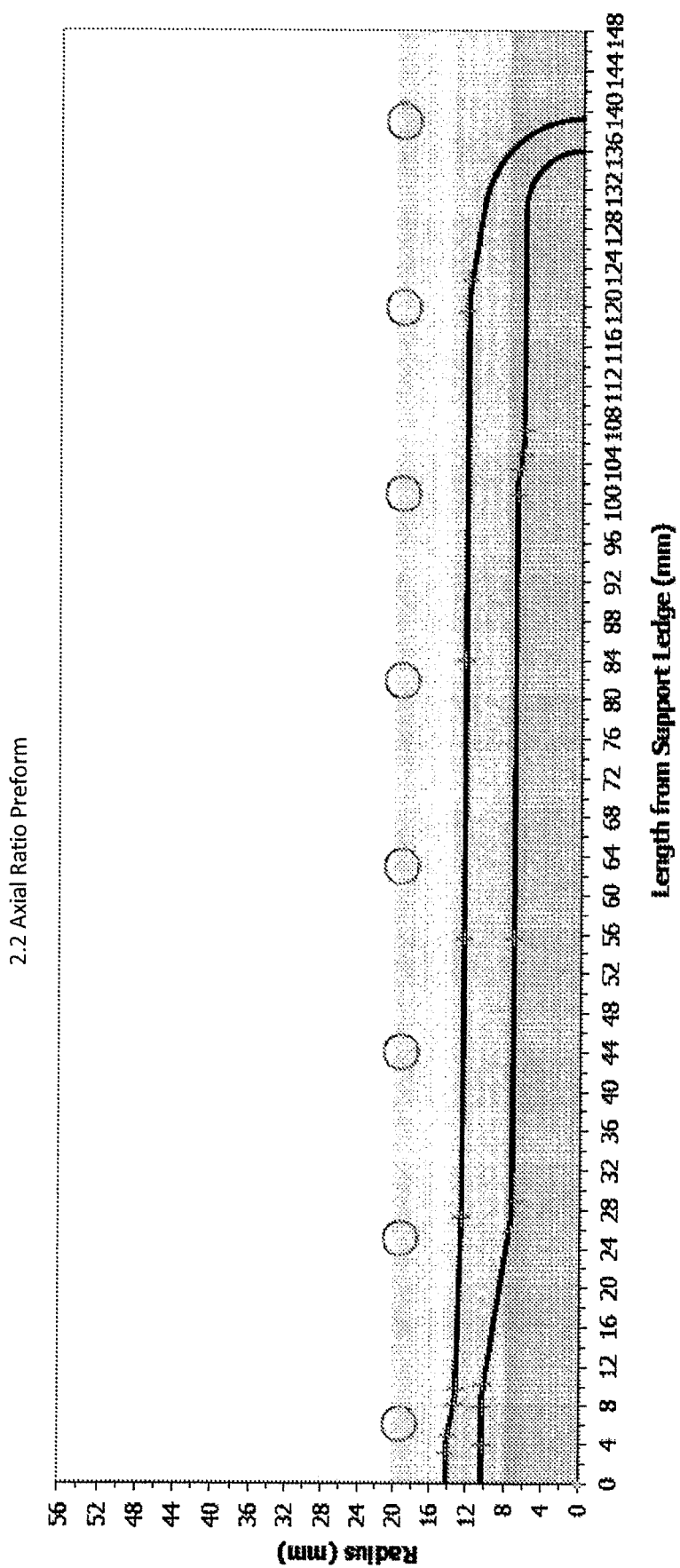
FIG. 5: shows the preform half-cross-section profile below the finish for the preform of FIG. 2.

The preform half-cross-section profile below the finish was determined. The five plots pertain to the following preforms, as shown in FIGS. 4 and 5.

TABLE I

|  | 2.2-Axial Ratio Preform | 3.2-Axial Ratio Preform |
| --- | --- | --- |
| Preform Weight (g) | 70.10 | 70.00 |
| Preform Length (mm) | 162.00 | 115.00 |
| Bottle Diameter (mm) | 81.50 | 81.50 |
| Finish Height (mm) | 22.80 | 22.80 |
| Body ID (mm) | 14.08 | 20.28 |
| Body Thickness (mm) | 5.35 | 6.47 |
| Length to Step from SL (mm) | 106.20 | 66.20 |
| Core Tip OD (mm) | 20.94 | 31.58 |
| Core Tip ID (mm) | 12.04 | 18.88 |
| Tip Thickness (mm) | 6.03 | 7.00 |
| Stretch Initiation Point (mm) | 4.00 | 4.00 |
| Bottle Contour Length (mm) | 312.74 | 312.74 |
| Preform Contour Length (mm) | 142.86 | 99.75 |
| Axial Stretch | 2.19 | 3.14 |
| Body Axial Stretch | 2.56 | 4.11 |
| Inside Hoop Stretch | 5.79 | 4.02 |
| Planar Stretch | 12.67 | 12.60 |

Example 5

Stretch Blow Molding of PEF Preforms

Two preforms were stretch blow molded using a Sidel™ SB01 single cavity stretch blow molding machine. The various dimensions and properties of the two preforms are shown in Table II.

Long Preform (ASR×HSR=2.20×4.20)

Viable stretch blow molding conditions could not be determined over a range of preform heating profiles, molding preblow and blow pressures, and inflation rates and times could be found for the long preform design.

Two stretch regimes were observed for the preform:

Upper inflation of the transition section with rupture of the preform between heating zones 6 and 7 bracketing the inner diameter step just before the end cap. The lower section of the preform in this case was stretched minimally, but significant stretching of the preform transition section was observed.

Lower inflation of the end cap with minimal or limited stretching of the preform transition and body sections. Preform rupture occurred in the vicinity of heater zones 2 to 3.

No combination of stretching conditions with the SB01 could be found which yielded a completely stretched bottle.

The long preform required significant heating of the end cap region to achieve stretching. For all runs, the oven heaters for the end cap region of the preform were run at maximum or near maximum power levels to achieve any extension. When heated to an overall oven power level above 80% full power, the heated preforms would begin to wobble and lose concentricity at the end cap. The preform would then become snagged on the stretch rod during axial stretching. Blowouts in the vicinity of heater zones 6 and 7 could have been due to stretch rod snagging of the non-concentric preform.

Short Preform (ASR×HSR=3.05×3.07)

Viable stretch blow molding conditions were determined over a range of preform heating profiles, molding preblow and blow pressures, and inflation rates and times could be found for the long preform design.

An infrared heating profile was determined for the bottle which provided near optimal distribution of wall thickness compared to the 1.0 liter refPET bottle reference. Excellent bottles were produced with no preblow, and a delayed high blow of 40 bars.

Resin distribution within the bottle (relative to the 1.0-liter standard ref PET bottle) was 0.47% low in the finish/neck region, 47.3% heavy in the transition section, 4.3% light in the body/sidewall section, and 22.1% low in the base region.

TABLE II

| Variable | CT-9774-01 (Long) Value | Units | CT-9778-01 (Short) Value | Units |
|---|---|---|---|---|
| Wall thickness, t | 5.31 | mm | 6.38 | mm |
| Inside radius, $r_i$ | 7.09 | mm | 7.09 | mm |
| Outside radius, $r_o$ | 9.74 | mm | 10.28 | mm |
| Atmospheric Pressure, $P_a$ | 1.00 | atm | 1.00 | atm |
| Internal Pressure, $P_i$ | 40.00 | bar | 40.00 | bar |
| Inside Hoop Stress, $\sigma_{h,i}$ | 703.96 | psi | 572.58 | psi |
| Outside Hoop Stress, $\sigma_{h,o}$ | 664.96 | psi | 533.58 | psi |
| Inside Hoop Stress/Inflation Pressure Ratio | 1.20 | — | 0.97 | — |
| Outside Hoop Stress/Inflation Pressure Ratio | 1.13 | — | 0.91 | — |
| Inside/Outside Hoop Stress Ratio | 1.06 | — | 1.07 | — |
| Inside Axial Stress, $\sigma_{l,i}$ | 538.31 | psi | 423.88 | psi |
| Outside Axial Stress, $\sigma_{l,o}$ | 577.31 | psi | 462.88 | psi |
| Inside Axial Stress/Inflation Pressure Ratio | 0.92 | — | 0.72 | — |
| Outside Axial Stress/Inflation Pressure Ratio | 0.98 | — | 0.79 | — |
| Inside/Outside Axial Stress Ratio | 0.93 | — | 0.92 | — |
| Inside Hoop/Axial Stress Ratio | 1.31 | — | 1.35 | — |
| Outside Hoop/Axial Stress Ratio | 1.15 | — | 1.15 | — |

Example 6

Free Blow Molding of PEF Preforms

TABLE III

Results PEF Preform Freeblow Experiments at PTI

| Date Performed: | May 17, 2013 |
|---|---|
| Free Blow Temperature (° C.) | 96 |
| Free Blow Pressure (psig) | 39 |

| Preform Sample Mass (g) | Length Above Finish (mm) | Starting Transition Diameter (mm) | Main Body Diameter (mm) | Main Body Preform Wall Thickness (mm) |
|---|---|---|---|---|
| 12.8 | 58.68 | 24.23 | 15.97 | 2.32 |

| | | | | | Measurement Locations on Freeblown Container | | | | | | |
|---|---|---|---|---|---|---|---|---|---|---|---|
| Preform Free Blow Sample | Length Above Finish (mm) | Free Blow Diameter at 70 mm (mm) | Free Blow Diameter at 140 mm (mm) | Axial Stretch Ratio (Outside) | 70 mm Hoop Stretch Ratio (Outside) | 140 mm Hoop Stretch Ratio (Outside) | 70 mm Overall Stretch Ratio (Outside) | 140 mm Overall Stretch Ratio (Outside) | Axial Stretch Ratio (Outside) | 140 mm Hoop Stretch Ratio (Outside) | 140 mm Overall Stretch Ratio (Inside) |
| A-1 | 200.42 | 75.86 | 79.67 | 3.42 | 4.75 | 4.99 | 16.2 | 17.0 | 3.56 | 7.03 | 25.0 |
| A-2 | 210.13 | 77.05 | 85.4 | 3.58 | 4.82 | 5.35 | 17.3 | 19.1 | 3.73 | 7.54 | 28.1 |
| A-3 | 207.99 | 76.29 | 84.73 | 3.54 | 4.78 | 5.31 | 16.9 | 18.8 | 3.69 | 7.48 | 27.6 |
| A-4 | 203.66 | 77.76 | 83.61 | 3.47 | 4.87 | 5.24 | 16.9 | 18.2 | 3.61 | 7.38 | 26.7 |
| A-5 | 214.42 | 77.23 | 85.48 | 3.65 | 4.84 | 5.35 | 17.7 | 19.6 | 3.80 | 7.54 | 28.7 |

The preforms were molded from PEF resin. The preform IV was measured at 0.744 dL/g. The preform temperature and free blow pressure were written on the free blow balloons themselves. Temperature was in the range of 95-100 C.

The finish lengths of the freeblown balloons were in the range of 200-215 mm. The outside diameters of the free-blown balloons were measured at axial positions of 70 mm and 140 mm along the containers, below the finish. Outside axial stretch ratios were obtained by dividing the outside measured length of the freeblown balloons by the outside main body length of the preform above the finish/support ring. Outside hoop stretch ratios were obtained by dividing the outside measured diameter of the freeblown balloons by the outside main body diameter. These data indicate an onset of hoop-direction strain hardening in the stretch ratio range of 4.5 to 5.5 at about 96° C. Taking into account the inside preform axial length and diameter, the overall stretch ratios for PEF freeblown balloons exceed 25.0 at 96° C., and reach as high as 28.7, without stress whitening.

Example 7

Injection Molding of PEF Preforms

Both long and short preforms were injection molded with a small gate which produced shear rates at the gate that may have been as high as 40,000 s$^{-1}$. According to information provided by PTI, Inc. process engineers, injection times averaged 6.9 s for each nominal 70 g preform, and the gate capillary diameter was 0.127 cm. for these conditions, the shear rate, γ, through the gate capillary is given by:

$$\dot{\gamma} = \frac{32Q}{\pi D^3} = \frac{32m}{\pi \rho t D^3}$$

where the volumetric flow rate of the resin melt, Q=m/ρt, m is the mass of resin of density ρ extruded in time t, and D is the diameter of the capillary. Assuming a PEF melt density at the injection molding temperature of about 1.30 g/cm$^3$, the shear rate in the gate capillary is:

$$\dot{\gamma} = \frac{32m}{\pi \rho t D^3} = \frac{32(70.0\ g)}{\pi \left(1.30 \frac{g}{cm^3}\right)(6.9\ s)(0.127\ cm)^3} = 38,800\ s^{-1}$$

Large bubbles were observed in the early produced preforms. This could be due to the large pressure drop taken over the gate which reduced the available mold packing pressure. Severe chattering near the gate and evidence of "jetting" of the melt into the empty mold at the start of filling induced non-uniform stress profiles which correlated with off-center alignment of the preform and bottle bases during stretch blow molding. Off-center alignment could be easily and repeatable demonstrated by segregating the preforms with severe chattering and non-uniform flow lines at the end cap. Preforms with transparent, uniform end caps processed with no problems in stretch blow molding.

Example 9

As it was observed that PEF does not process similarly to PET because of the inherently different mechanical properties for these two resin systems, new axial and hoop stretch ratios were defined for preform designs that would yield stretch blow molded bottles of acceptable quality and performance.

A. Experimental Validation of Concept

Figure 6:
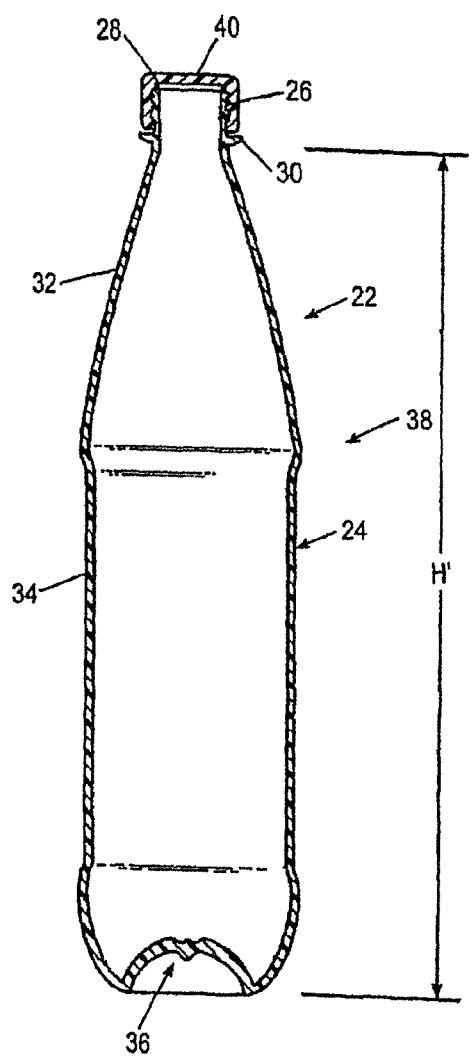
FIG. 6: A sectional view of a stretch blow molded container made from the preform of FIG. 1 in accordance with one embodiment of this invention.
Figure 7A:
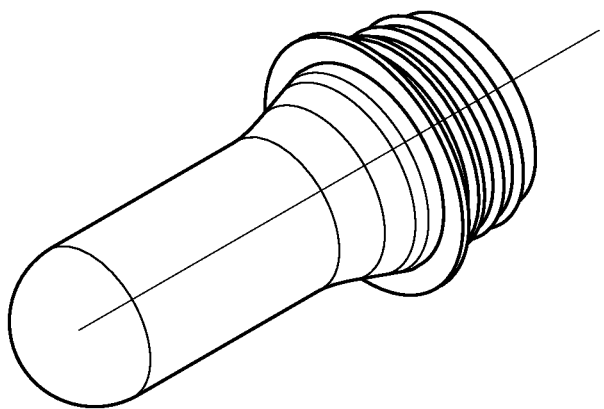
FIG. 7: Is a sectional view of an injection molded preform in accordance with an embodiment of the present invention (CT-10029-1).
Figure 7B:
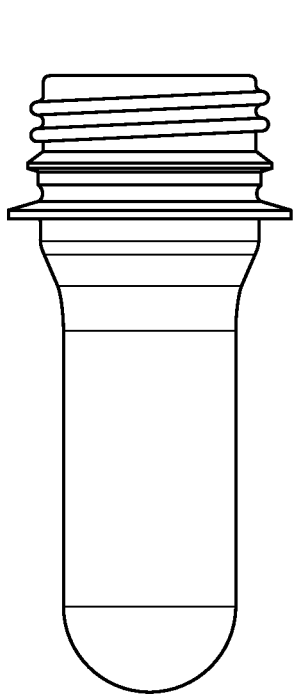
Figure 7C:
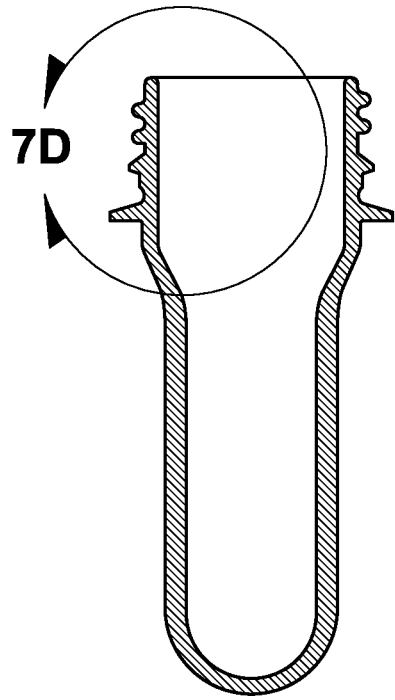
Figure 7D:
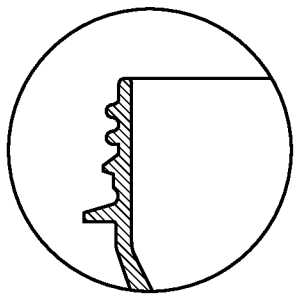
Figure 8A:
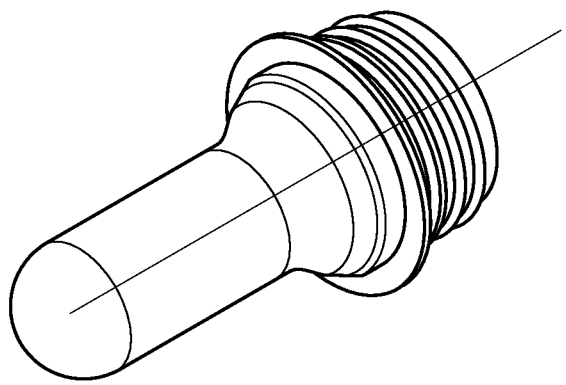
FIG. 8: Is a sectional view of an injection molded preform in accordance with an embodiment of the present invention (CT-10030-1).
Figure 8D:
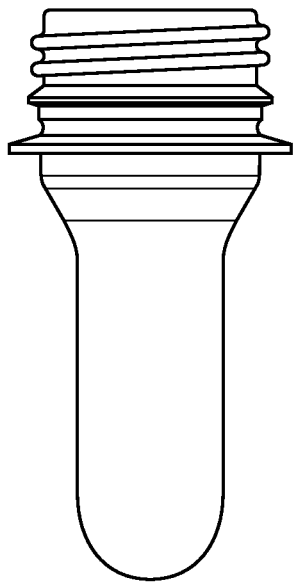
Figure 8D:
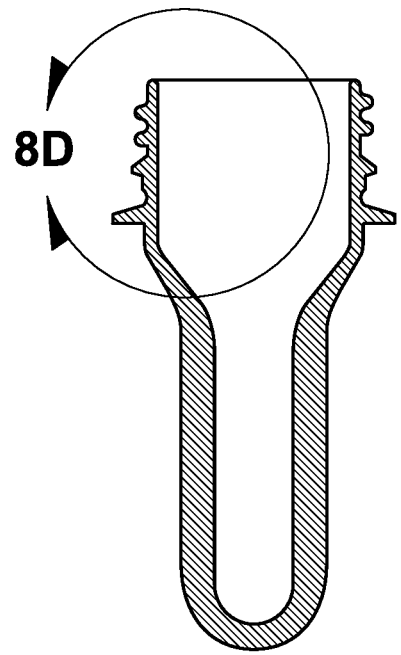
Figure 8D:
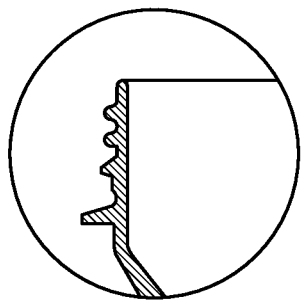
Figure 9A:
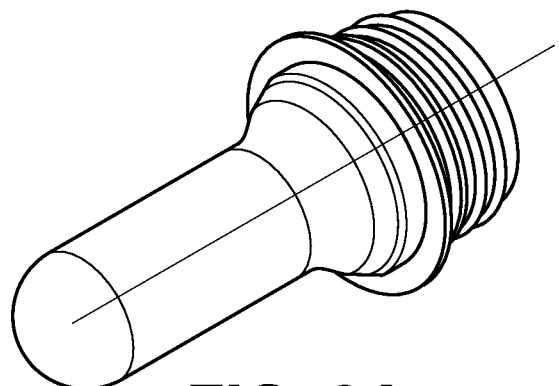
FIG. 9: Is a sectional view of an injection molded preform in accordance with an embodiment of the present invention (CT-10030-1).
Figure 9B:
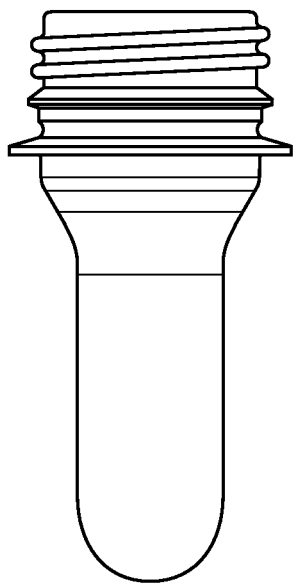
Figure 9C:
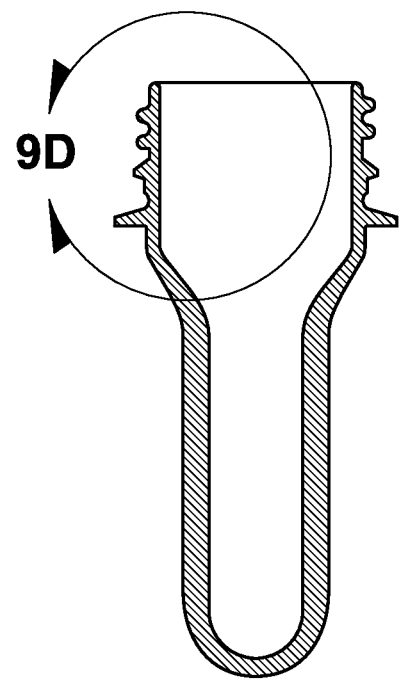
Figure 9D:
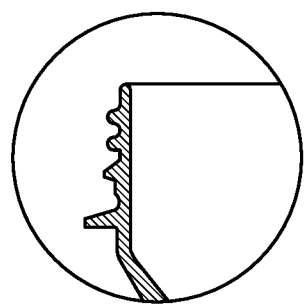
Figure 10A:
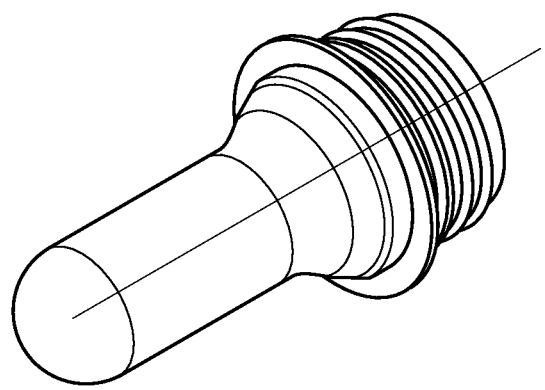
FIG. 10: Is a sectional view of an injection molded preform in accordance with an embodiment of the present invention (CT-10031-1).
Figure 10B:
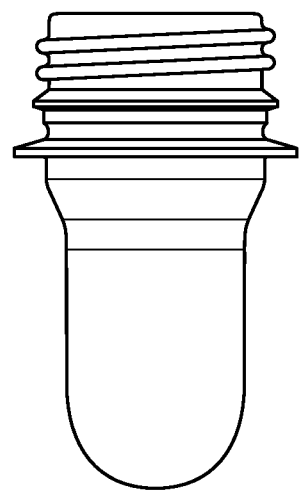
Figure 10C:
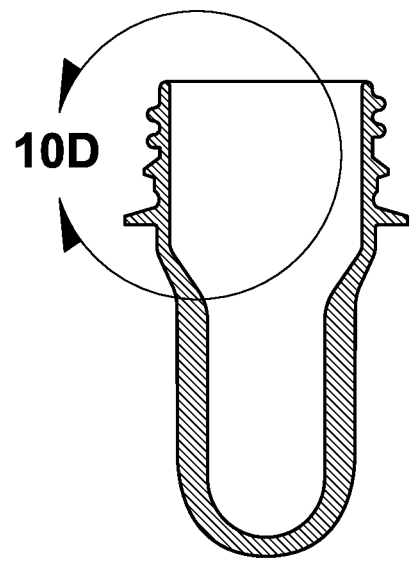
Figure 10D:
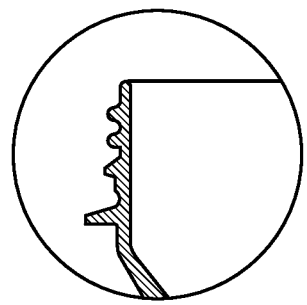
Figure 11A:
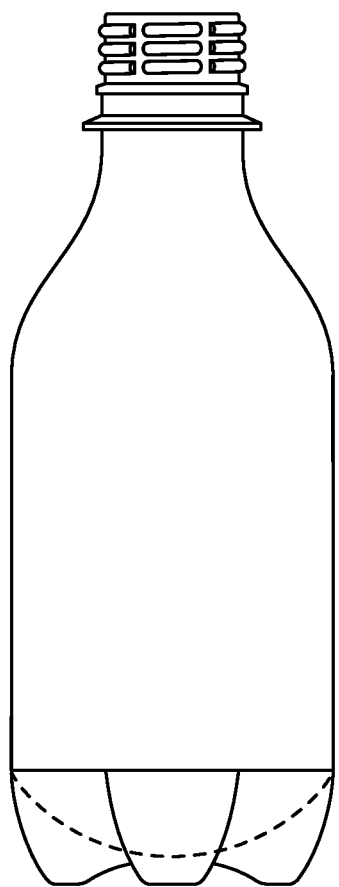
FIG. 11: Is a sectional view of straight wall bottle design in accordance with an embodiment of the present invention (PT-1678) (10 oz.).
Figure 11B:
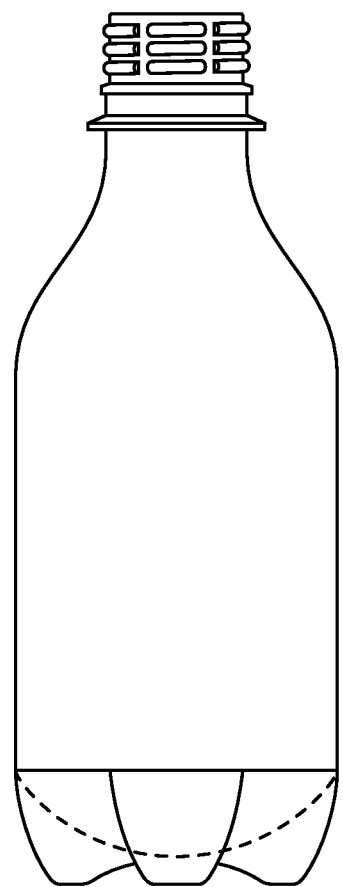
Figure 11C:
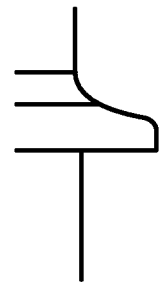
Figure 12A:
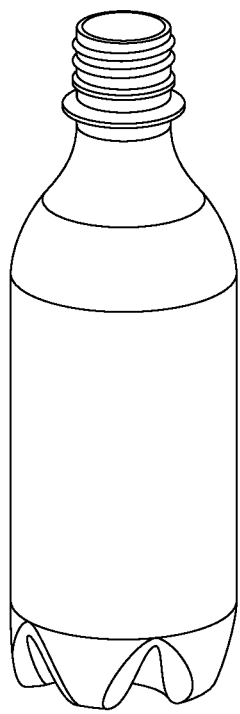
FIG. 12: Is a sectional view of straight wall bottle design in accordance with an embodiment of the present invention (PT-1678) (10 oz.).
Figure 12B:
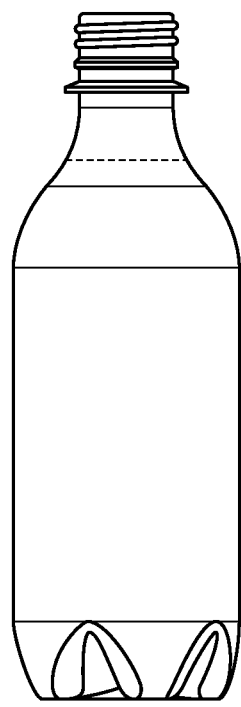
Figure 12C:
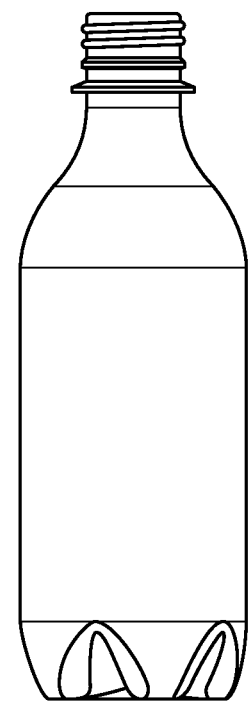
Figure 12D:
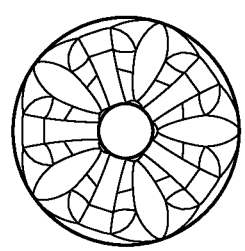
Figure 13A:
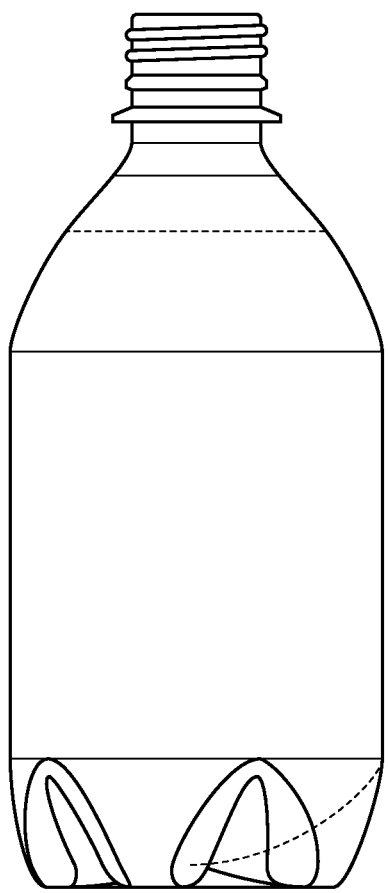
FIG. 13: Is a sectional view of straight wall bottle design in accordance with an embodiment of the present invention (PT-2866) (16 oz.).
Figure 13B:
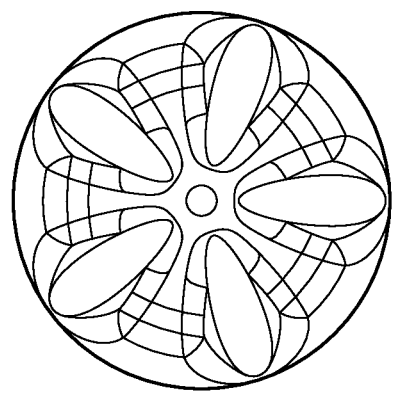

In order to validate this concept, four unique 13 g preforms (FIG. 1 through 4) were designed to achieve areal stretch ratios (areal stretch ratio=axial stretch ratio×hoop stretch ratio) ranging from 11 to 29 across three straight wall bottle designs (FIG. 5 through 7), ranging in size from 10 oz. to 16 oz. Table 1 also provides a summary of selected relevant preform and bottle dimensions. The employed preform designs, bottle designs, and experiment details are summarized in a report by Plastic Technologies, Inc. dated Feb. 13, 2014. An electronic copy of this report is included with this disclosure and incorporated herein by reference.

TABLE III

Experiment plan for PEF preform design evaluation.

| Run Number | PTI Preform Drawing | Straight Land (mm) | Transition Section Length (mm) | Body Length (mm) | Body Thickness (mm) | End Cap Body Inside Diameter (mm) | Endcap Tip Thickness (mm) | Preform IV (dL/g) |
|---|---|---|---|---|---|---|---|---|
| 1 | CT 10032-1 | 3.00 | 7.00 | 20.73 | 3.24 | 14.82 | 2.43 | 0.833 |
| 2 | | | | | | | | |
| 3 | | | | | | | | |
| 4 | CT 10029-1 | 3.00 | 7.00 | 35.79 | 2.35 | 14.76 | 1.76 | 0.815 |
| 5 | | | | | | | | |
| 6 | | | | | | | | |
| 7 | CT 10031-1 | 3.00 | 7.00 | 33.47 | 3.05 | 11.12 | 2.29 | 0.800 |
| 8 | | | | | | | | |
| 9 | | | | | | | | |
| 10 | CT 10030-1 | 3.00 | 7.00 | 30.72 | 3.68 | 8.92 | 2.76 | 0.809 |
| 11 | | | | | | | | |
| 12 | | | | | | | | |
| PET Control - A | CT 10029-1 | 3.00 | 7.00 | 35.79 | 2.35 | 14.76 | 1.76 | 0.833 |
| PET Control - B | | | | | | | | |
| PET Control - C | | | | | | | | |

TABLE III-continued

Experiment plan for PEF preform design evaluation.

| Run Number | PTI Bottle Drawing | Neck Height (mm) | Label Panel Height (mm) | Base Height (mm) | Bottle Volume (oz) | Axial Stretch Ratio | Inside Hoop Stretch Ratio | Bottle Areal Stretch Ratio |
|---|---|---|---|---|---|---|---|---|
| 1 | PT-1678 | 45.09 | 74.50 | 21.01 | 10 | 3.55 | 4.00 | 14.20 |
| 2 | PT-1679 | 44.78 | 96.01 | 21.07 | 12 | 4.00 | 4.00 | 16.00 |
| 3 | PT-2866 | 45.01 | 80.24 | 25.40 | 16 | 3.95 | 4.89 | 19.32 |
| 4 | PT-1678 | 45.09 | 74.50 | 21.01 | 10 | 2.75 | 4.00 | 11.00 |
| 5 | PT-1679 | 44.78 | 96.01 | 21.07 | 12 | 3.10 | 4.00 | 12.40 |
| 6 | PT-2866 | 45.01 | 80.24 | 25.40 | 16 | 3.06 | 4.89 | 14.96 |
| 7 | PT-1678 | 45.09 | 74.50 | 21.01 | 10 | 2.93 | 5.30 | 15.53 |
| 8 | PT-1679 | 44.78 | 96.01 | 21.07 | 12 | 3.30 | 5.30 | 17.49 |
| 9 | PT-2866 | 45.01 | 80.24 | 25.40 | 16 | 3.26 | 6.48 | 21.12 |
| 10 | PT-1678 | 45.09 | 74.50 | 21.01 | 10 | 3.11 | 6.60 | 20.53 |
| 11 | PT-1679 | 44.78 | 96.01 | 21.07 | 12 | 3.50 | 6.60 | 23.10 |
| 12 | PT-2866 | 45.01 | 80.24 | 25.40 | 16 | 3.45 | 8.07 | 27.84 |
| PET Control - A | PT-1679 | 45.09 | 74.50 | 21.01 | 12 | 2.75 | 4.00 | 11.00 |
| PET Control - B | PT-1678 | 44.78 | 96.01 | 21.07 | 10 | 3.10 | 4.00 | 12.40 |
| PET Control - C | PT-2866 | 45.01 | 80.24 | 25.40 | 16 | 3.06 | 4.89 | 14.96 |

Preform Injection Molding Procedure: The PEF resin was dried a minimum of 48 hours at 140° C. under vacuum. Each preform tooling was installed on an Arburg 420 injection molding machine with a valve-gated hot runner end cap and a 35 mm general purpose screw configuration. The injection molding conditions were optimized to produce acceptable preforms with minimum molded-in stresses and no visual defects at the minimum melt temperature.

Reheat Injection Molding Procedure: All bottles were blown on a Sidel SB01 lab reheat stretch blow molding machine. The blow molding conditions listed below were used to produce bottles for further study at TCCC. Bottles were produced from all preform and bottle combinations with the exception of the 43104A1, which was the highest stretch ratio preform and bottle combination. Using preform design 3 (CT-10029-1), PET control bottles were produced with each bottle mold.

Analytical Testing of Fabricated Bottles: Then resulting test bottles were submitted to Global Packaging Analytical Services for transient testing of bottle material distribution, volumetric creep, and shelf life.

B. Results

Preform and bottle dimensions, measured perform intrinsic viscosities, and results for creep testing and carbonated beverage shelf life for the produced bottles at 22° C. and 38° C. are summarized in Table 2.

Preferred, more preferred and most preferred ranges for the axial and inside hoop stretch ratios for unmodified PEF resins in the range of intrinsic viscosities between 0.65 and 1.00 dL/g. Based upon the results for volumetric creep and shelf life, most preferred stretch ratio ranges were found to be bifurcated for the PEF bottles considered in this study. The elliptical domains were conveniently defined for preferred, more preferred, and most preferred stretch ration domains. These ranges were as follows:

Preferred:
Axial ratio coordinate (abscissa) offset: 3.35
Inside hoop ratio coordinate (ordinate) offset: 5.45
Major axis radius: 2.75
Minor axis radius: 1.25
Major axis rotation relative to axial stretch ratio abscissa: −75° (−1.31 radians)

More Preferred:
Axial ratio coordinate (abscissa) offset: 3.20
Inside hoop ratio coordinate (ordinate) offset: 5.35
Major axis radius: 2.30
Minor axis radius: 1.00
Major axis rotation relative to axial stretch ratio abscissa: −75° (−1.31 radians)

Most Preferred (High Hoop Stretch):
Axial ratio coordinate (abscissa) offset: 2.80
Inside hoop ratio coordinate (ordinate) offset: 6.20
Major axis radius: 1.00
Minor axis radius: 0.48
Major axis rotation relative to axial stretch ratio abscissa: −80° (−1.40 radians)

Most Preferred (Low Hoop Stretch):
Axial ratio coordinate (abscissa) offset: 3.55
Inside hoop ratio coordinate (ordinate) offset: 4.35
Major axis radius: 0.85
Minor axis radius: 0.47
Major axis rotation relative to axial stretch ratio abscissa: −90° (−1.57 radians)

TABLE IV

Volumetric creep and shelf life data at 22° C., 100% RH and 38° C., 85% RH.

| Run Number | PTI Preform Drawing | PTI Bottle Drawing | Axial Stretch Ratio | Inside Hoop Stretch Ratio | Bottle Areal Stretch Ratio | Preform IV (dL/g) | Shelf Life (wks @ 22° C., 100% RH) | Initial Volumetric Creep Strain (% @ 22° C., 100% RH) | Shelf Life (wks @ 38° C., 85% RH) | Initial Volumetric Creep Strain (% @ 38° C., 85% RH) |
|---|---|---|---|---|---|---|---|---|---|---|
| 1 | CT 10032-1 | PT-1678 | 3.55 | 4.00 | 14.20 | 0.833 | 43.4 | 4.06 | 6.4 | 9.9 |
| 2 | | PT-1679 | 4.00 | 4.00 | 16.00 | | 37.3 | 9.34 | 3.9 | 10.3 |
| 3 | | PT-2866 | 3.95 | 4.89 | 19.32 | | — | — | — | — |
| 4 | CT 10029-1 | PT-1678 | 2.75 | 4.00 | 11.00 | 0.815 | 28.0 | 6.28 | — | — |

TABLE IV-continued

Volumetric creep and shelf life data at 22° C., 100% RH and 38° C., 85% RH.

| Run Number | PTI Preform Drawing | PTI Bottle Drawing | Axial Stretch Ratio | Inside Hoop Stretch Ratio | Bottle Areal Stretch Ratio | Preform IV (dL/g) | Shelf Life (wks @ 22° C., 100% RH) | Initial Volumetric Creep Strain (% @ 22° C., 100% RH) | Shelf Life (wks @ 38° C., 85% RH) | Initial Volumetric Creep Strain (% @ 38° C., 85% RH) |
|---|---|---|---|---|---|---|---|---|---|---|
| 5 | | PT-1679 | 3.10 | 4.00 | 12.40 | | 32.6 | 8.26 | 4.1 | 18.9 |
| 6 | | PT-2866 | 3.06 | 4.89 | 14.96 | | — | — | — | — |
| 7 | CT 10031-1 | PT-1678 | 2.93 | 5.30 | 15.53 | 0.800 | 36.8 | 6.16 | — | — |
| 8 | | PT-1679 | 3.30 | 5.30 | 17.49 | | 37.4 | 6.06 | 4.1 | 16.2 |
| 9 | | PT-2866 | 3.26 | 6.48 | 21.12 | | 35.1 | 8.28 | — | — |
| 10 | CT 10030-1 | PT-1678 | 3.11 | 6.60 | 20.53 | 0.809 | 41.5 | 4.24 | 6.4 | 12.0 |
| 11 | | PT-1679 | 3.50 | 6.60 | 23.10 | | 27.3 | 8.02 | — | — |
| 12 | | PT-2866 | 3.45 | 8.07 | 27.84 | | — | — | — | — |
| PET Control - A | CT 10029-1 | PT-1679 | 2.75 | 4.00 | 11.00 | 0.833 | 7.0 | 6.28 | 1.9 | 9.3 |
| PET Control - B | | PT-1678 | 3.10 | 4.00 | 12.40 | | 7.6 | 4.36 | 3.2 | 9.3 |
| PET Control - C | | PT-2866 | 3.06 | 4.89 | 14.96 | | 6.5 | 9.63 | — | — |

Bottles produced within the most preferred ranges of stretch ratios yielded comparable initial volumetric creep, but significantly higher shelf life, PEF bottles produced in the preferred and more preferred ranges yielded higher volumetric creep strains than the corresponding PET bottles, but the shelf life was still over twice as high as for bottle the lowest recorded PEF shelf life.

The invention claimed is:

1. A beverage bottle made from a preform comprising a polymer comprising 2,5-furandicarboxylic acid (FDCA) and at least one diol; wherein the polymer comprises at least about 50 wt % FDCA, and wherein the preform has a (i) hoop stretch ratio of between about 5.2 and about 7.2 and (ii) an axial stretch ratio between about 2.3 and about 3.3.

2. The beverage bottle claim 1, wherein the at least one diol is ethylene glycol.

3. The beverage bottle of claim 1, wherein the at least one diol is bio-based.

4. The beverage bottle of claim 1, wherein the preform has a length of between about 20 and about 400 mm.

5. The beverage bottle of claim 1, wherein the preform has a length of between about 20 and about 50 mm.

6. The beverage bottle of claim 1, wherein the beverage bottle is a carbonated beverage bottle.

7. The beverage bottle of claim 1, wherein the beverage bottle has a shelf life of at least 8 weeks.

8. The beverage bottle of claim 1, wherein the beverage bottle has a shelf life of at least 20 weeks.

9. The beverage bottle of claim 1, wherein the beverage bottle has a shelf life of between about 20 and about 50 weeks.

10. A method of producing a bottle, comprising (i) providing a preform comprising a polymer comprising 2,5-furandicarboxylic acid (FDCA and at least one diol; wherein the polymer comprises at least about 50 wt % FDCA, and wherein the preform has (a) a hoop stretch ratio of between about 5.2 and about 7.2 and (b) an axial stretch ratio between about 2.3 and about 3.3, and (ii) forming a bottle from the preform by injection stretch blow molding, wherein the bottle is a beverage bottle.

11. The method of claim 10, wherein the at least one diol is ethylene glycol.

12. The method of claim 10, wherein the at least one diol is bio-based.

13. The method of claim 10, wherein the preform has a length of between about 20 and about 400 mm.

14. The method of claim 10, wherein the preform has a length of between about 20 and about 50 mm.

15. The method of claim 10, wherein the bottle is a carbonated beverage bottle.

16. A method of producing a preform for injection stretch blow molding, comprising (i) providing a polymer comprising 2,5-furandicarboxylic acid (FDCA and at least one diol; wherein the polymer comprises at least about 50 wt % FDCA; (ii) injection molding the polymer to provide the preform, wherein the preform has a (a) hoop stretch ratio of between about 5.2 and about 7.2 and (b) an axial stretch ratio between about 2.3 and about 3.3.

17. The method of claim 16, wherein the at least one diol is ethylene glycol.

18. The method of claim 16, wherein the at least one diol is bio-based.

19. The method of claim 16, wherein the preform has a length of between about 20 and about 400 mm.

20. The method of claim 16, wherein the preform has a length of between about 20 and about 50 mm.

21. The method of claim 16, wherein the beverage bottle is a bottle for carbonated beverages.

* * * * *